(12) United States Patent
Akiyama

(10) Patent No.: US 8,040,577 B2
(45) Date of Patent: Oct. 18, 2011

(54) IMAGE READING APPARATUS

(75) Inventor: Shigeki Akiyama, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 988 days.

(21) Appl. No.: 11/934,217

(22) Filed: Nov. 2, 2007

(65) Prior Publication Data
US 2008/0106773 A1 May 8, 2008

(30) Foreign Application Priority Data

Nov. 2, 2006 (JP) ................................. 2006-299161

(51) Int. Cl.
*H04N 1/04* (2006.01)

(52) U.S. Cl. ........ 358/486; 358/497; 358/483; 358/444; 358/412; 358/496

(58) Field of Classification Search .................. 358/486, 358/488, 412, 404, 444, 496, 497, 483, 482, 358/512–514; 399/208, 211, 212; 250/234–236
See application file for complete search history.

(56) References Cited

U.S. PATENT DOCUMENTS

| | | | |
|---|---|---|---|
| 6,390,588 B1 | 5/2002 | Ikeda | |
| 6,972,876 B2 | 12/2005 | Yokochi | |
| 7,136,200 B2 * | 11/2006 | Chen et al. | 358/474 |
| 7,170,659 B2 * | 1/2007 | Jones | 358/496 |
| 2010/0231983 A1 * | 9/2010 | Nozaki | 358/426.01 |

FOREIGN PATENT DOCUMENTS

| | | | |
|---|---|---|---|
| JP | H09-009003 | A | 1/1997 |
| JP | 2000-094718 | A | 4/2000 |
| JP | 2000-184140 | A | 6/2000 |
| JP | 2001042536 | A | 2/2001 |
| JP | 2002176534 | A | 6/2002 |
| JP | 2003078718 | A | 3/2003 |
| JP | 2006025290 | A | 1/2006 |

OTHER PUBLICATIONS

Japan Patent Office, Notice of Reason(s) for Rejection for Japanese Patent Application No. 2006-299161 (counterpart to above-captioned patent application), mailed Oct. 12, 2010.

* cited by examiner

*Primary Examiner* — Cheukfan Lee
(74) *Attorney, Agent, or Firm* — Baker Botts L.L.P.

(57) ABSTRACT

In an image reading apparatus, a retreat control device moves a conveyance target through a conveyance mechanism, when a stop operation is performed by a stop control device, in an opposite direction to an image reading direction to a position further from a restart reference position set by a position setting unit. A reading control device again moves the conveyance target, which has been moved by the retreat control device, at a constant speed in the image reading direction under a predetermined condition; inputs a line start signal to a reading unit when an offset time set by a time setting unit has elapsed from a time point when the conveyance target reaches the restart reference position; and periodically inputs a line start signal to thereby cause the reading unit to perform a reading operation from a point; where the reading unit is located when the offset time has elapsed.

18 Claims, 21 Drawing Sheets

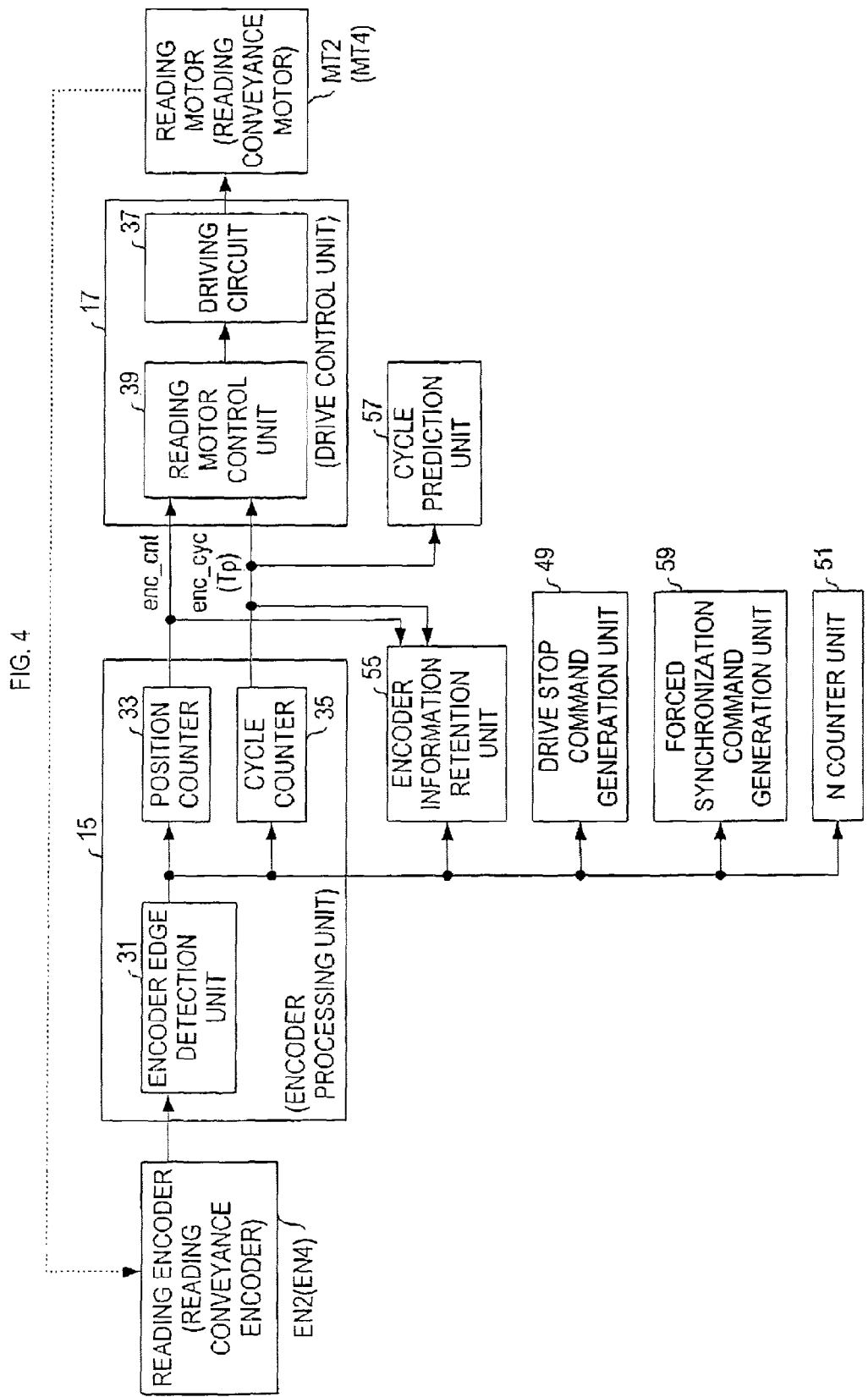

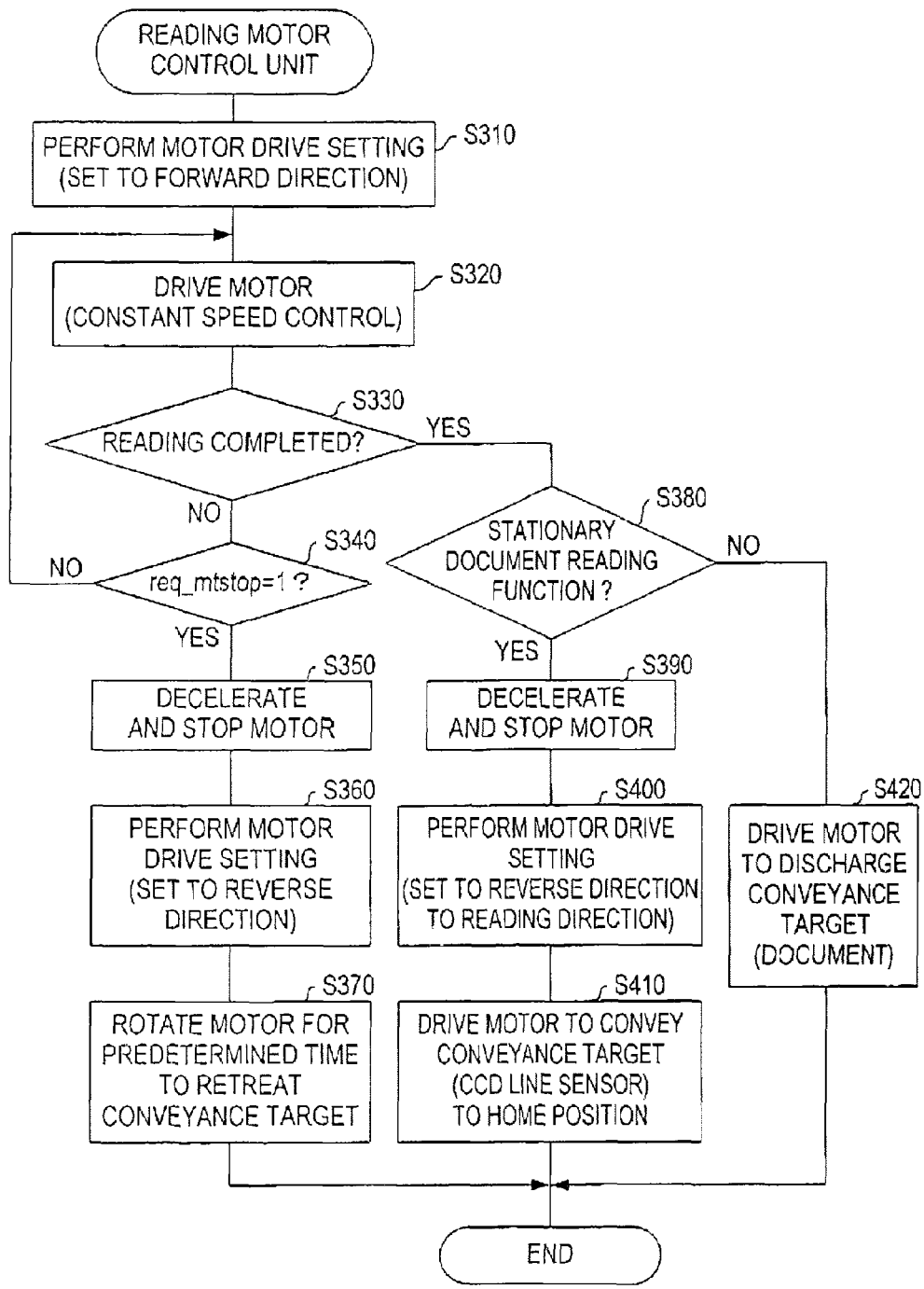

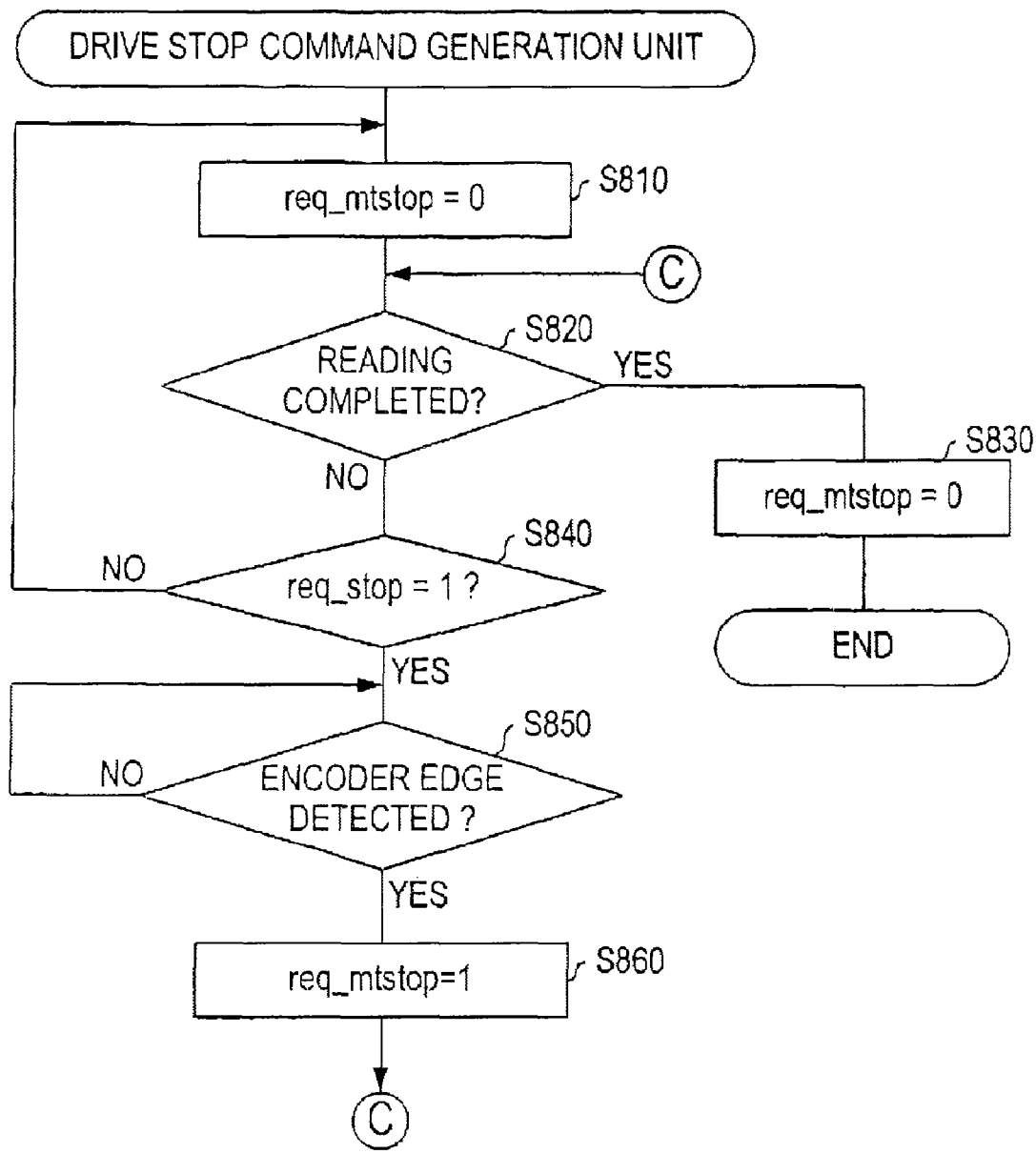

IMAGE READING APPARATUS

CROSS-REFERENCE TO RELATED APPLICATIONS

This application claims the benefit of Japanese Patent Application No. 2006-299161 filed Nov. 2, 2006 in the Japan Patent Office, the disclosure of which is incorporated herein by reference.

BACKGROUND

This invention relates to an image reading apparatus that changes a relative position between a reading unit and a reading target to read an image line by line.

There are known image reading apparatuses, such as a flat-bed type image reading apparatus and an auto document feeder-type (ADF-type) image reading apparatus. In the flat-bed type image reading apparatus, a reading target (a document) remains in a stationary state, and a reading unit performs reading operation while being conveyed over the reading target to thereby read image information of the reading target. In the ADF-type image reading apparatus, a reading unit remains in a fixed state and reads image information of a reading target (a document) while the reading target is conveyed over the reading unit.

Another type of image reading apparatus includes, as a reading unit, a CCD line sensor having a plurality of light receiving elements (photo diodes) aligned along a line direction. In this type of image reading apparatus, pixel data is generated depending on electric charges accumulated in the respective light receiving elements, and pixel data for one line is arranged to generate line image data.

A pulse motor and a DC (Direct Current) motor are known conventional drive sources for conveying the reading unit. The pulse motor is commonly used due to easiness in position control and convenience in configuring a control system of the pulse motor. A pulse motor, however, has disadvantages that noise and power consumption during driving are larger than in a DC motor and that scanning speed during driving is slower than in a DC motor. Therefore, in these days, development of an image reading apparatus, in which a DC motor is employed as a driving source, is performed actively for the purpose of reducing noise and power consumption and improving speediness during driving.

SUMMARY

However, in a recent image reading apparatus having a high reading resolution, a data transfer speed to an external apparatus or a speed of image processing after reading operation, such as gamma correction, is slower than an image reading speed in some case.

In such a case, a buffer for accumulating image data outputted from the reading unit becomes filled before an image reading operation for one sheet of a document has been completed. To complete the image reading operation for one sheet of the document, in a conventional image reading apparatus, the image reading operation is temporarily stopped when an amount of free space of the buffer becomes smaller than a threshold value, and is restarted when a certain amount of free space is secured in the buffer.

When the image reading operation is temporarily stopped and is restarted, distortion or uneven density of an image will occur in an area corresponding to a position where the image reading operation is temporarily stopped and restarted unless a restarting operation is performed appropriately. Accordingly, various measures have been proposed to avoid occurrence of such distortion or uneven density.

For example, in an image reading apparatus provided with a DC motor as a drive source, a timing of a line cycle signal (a line start signal) outputted from a CCD driving circuit to a reading portion is synchronized with a timing of a signal outputted from an encoder. By this, an accumulation starting position of electric charge is adjusted to a reading starting position, to thereby avoid occurrence of a displacement at a time of restarting. Specifically, a point where a signal is outputted from the encoder is constantly set to the reading start point, so that a reading restart point is set based on positional information obtained from the encoder to avoid occurrence of a displacement at the time of restarting reading operation.

In a case of using a pulse motor as a drive source, since position control can be performed highly accurately by the pulse motor, a relationship between a position of the reading unit and the reading start point can be recognized accurately. In contrast, in a case of using a DC motor as a drive source, a position of the reading unit can be recognized by the encoder only afterward as a value depending on a resolution performance of the encoder. Accordingly, occurrence of a displacement at the time of restarting reading operation is avoided by adjusting a signal output point of the encoder to the reading start point.

To adjust the signal output point of the encoder to the reading start point, however, it is required to adjust a signal cycle of the encoder (i.e., the resolution performance) to a reading resolution in a sub scanning direction. Specifically, it is required to use a higher-performance encoder as the reading resolution becomes higher. This leads to a problem that use of such a higher-performance encoder results in an increased manufacturing cost of an image reading apparatus, and thus prevents supply of an inexpensive image reading apparatus.

It is, therefore, desirable to provide a technique which may facilitate appropriate setting of a reading restart point when reading operation is restarted, even in a case where a resolution performance of an encoder is inferior to a line interval.

In one aspect of the present invention, an image reading apparatus includes: a reading unit, a conveyance mechanism, a reading control device, a stop control device, an encoder, a position detection device, an elapsed time measuring device, a time setting unit, a position setting unit and a retreat control device.

The reading unit reads image information of a reading target. The conveyance mechanism conveys one of the reading unit and the reading target as a conveyance target.

The reading control device controls a moving speed of the conveyance target through the conveyance mechanism to thereby move the conveyance target at a constant speed in an image reading direction and periodically inputs a line start signal to the reading unit to thereby specify a reading start timing of a line image on the reading target so that the reading unit is caused to perform a reading operation of each line.

The stop control device stops a process by the reading control device under a predetermined condition. The encoder outputs an event occurrence signal each time the conveyance target is moved by a predetermined distance. The position detection device detects a current position of the conveyance target based on an event occurrence signal inputted from the encoder.

The elapsed time measuring device measures an elapsed time from a time point when a last event occurrence signal is inputted from the encoder until a time point when a line start signal is inputted to the reading unit.

The time setting unit sets an offset time based on the elapsed time measured by the elapsed time measuring device, the elapsed time being an elapsed time until a reading interruption time point when a last line start signal is inputted to the reading unit at or before a time point when a stop operation on the reading control device is performed by the stop control device.

In the present specification, a time in the past direction including a time point A is referred to as "at or before the time point A".

The position setting unit sets, as a restart reference position, a position of the conveyance target detected by the position detection device correspondingly to an input of a last event occurrence signal inputted at or before the reading interruption time point.

The retreat control device moves the conveyance target through the conveyance mechanism, when a stop operation is performed by the stop control device, in an opposite direction to the image reading direction to a position forward from the restart reference position set by the position setting unit.

The reading control device again moves the conveyance target, which has been moved by the retreat control device, at a constant speed in the image reading direction under a predetermined condition, inputs a line start signal to the reading unit when an offset time set by the time setting unit has elapsed from a time point when the conveyance target reaches the restart reference position set by the position setting unit and subsequently periodically inputs a line start signal to thereby cause the reading unit to perform a reading operation from a point where the reading unit is located when the offset time has elapsed.

According to the image reading apparatus configured as above, an elapsed time from an input time point of an event occurrence signal inputted from the encoder is measured to estimate a reading stop point based on positional information obtained from the encoder and the elapsed time. At the time of restarting reading, reading operation is restarted from the reading stop point based on the positional information obtained from the encoder and the elapsed time.

According to the image reading apparatus, therefore, even when a position resolution performance of the encoder is inferior to a line interval (a distance the conveyance target moves in a cycle of the line start signal during a constant speed driving), it may be possible to restart reading operation appropriately from the reading stop point, and may be possible to suppress distortion of a read image at a boundary between the reading stop point and the reading restart point.

BRIEF DESCRIPTION OF THE DRAWINGS

The invention will now be described below, by way of example, with reference to the accompanying drawings, in which:

FIG. 4 is a block diagram showing configurations of an encoder processing unit and a drive control unit;

FIG. 6 is a flowchart showing a process performed by a reading motor control unit;

FIG. 13 is a flowchart showing a process performed by a drive stop command generation unit;

DETAILED DESCRIPTION OF THE PREFERRED EMBODIMENTS

[1] General Configuration of Multifunction Apparatus

Figure 1:
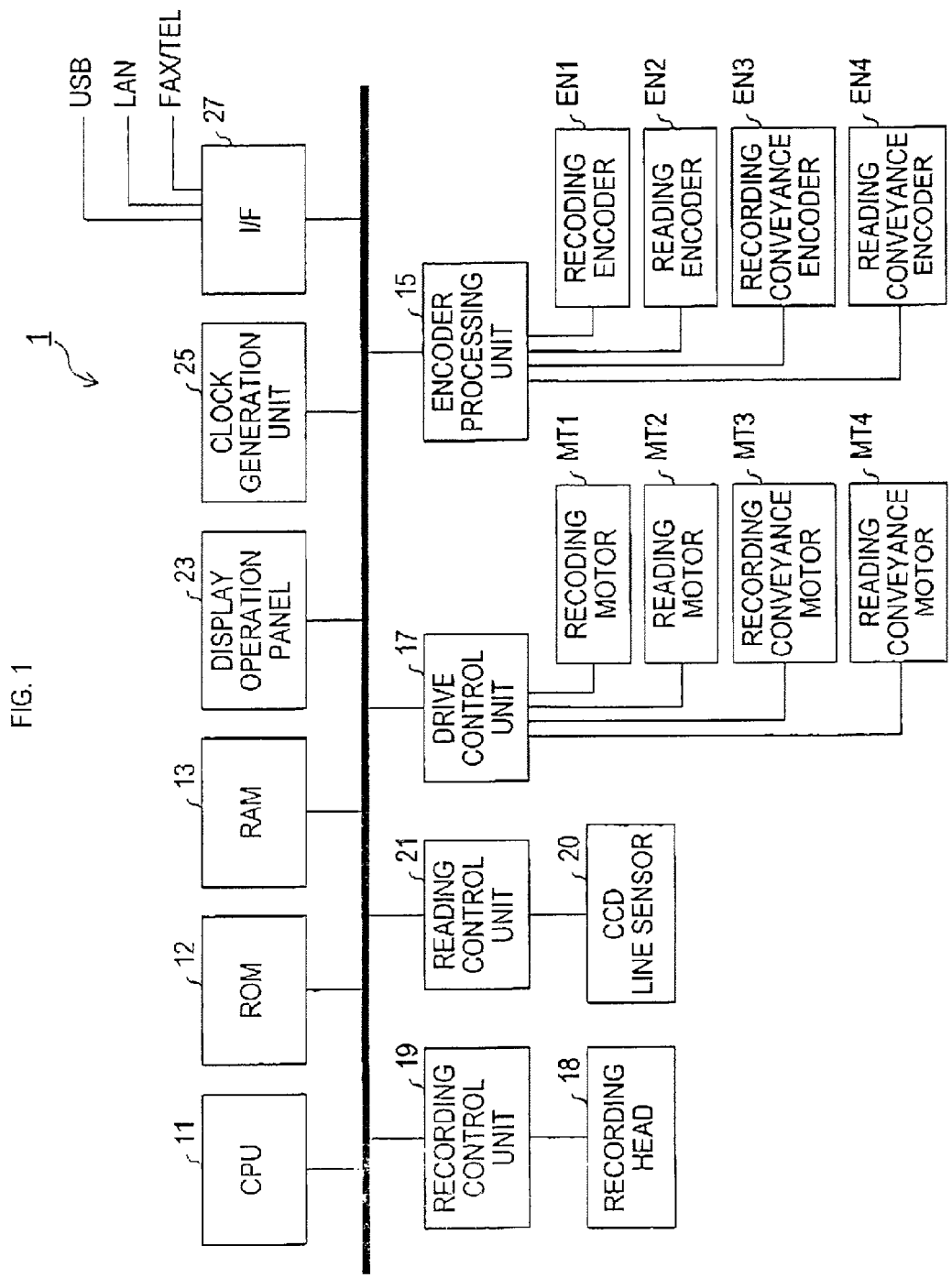
FIG. 1 is a block diagram showing a general configuration (an electrical configuration) of a multifunction apparatus.

A multifunction apparatus 1 shown in FIG. 1 according to an embodiment of the present invention has a printer function a copier function, a scanner function and a facsimile function. The multifunction apparatus 1 includes a CPU 11, a ROM 12, and a RAM 13. The CPU 11 comprehensively controls the entire multifunction apparatus 1. The ROM 12 stores various programs executed by the CPU 11, data, etc. The RAM 13 is used as a work area during operation of the CPU 11.

The multifunction apparatus also 1 includes an encoder processing unit 15, a drive control unit 17, a recording control unit 19, a reading control unit 21, a display operation panel 23, a clock generation unit 25 and an external interface 27.

The encoder processing unit 15 performs processings in accordance with pulse signals from encoders EN1, EN2, EN3 and EN4. The drive control unit 17 controls motors MT1, MT2, MT3 and MT4. The recording control unit 19 controls image formation by a recording head 18. The reading control unit 21 controls image reading by a CCD line sensor 20. The display operation panel 23 includes a display for displaying information and operation keys for receiving a user's operation. The clock generation unit 25 generates a clock signal having a substantially shorter cycle than each of the pulse signals outputted from the encoders EN1 to EN4 and each of line start signals outputted from a reading front end 41, and provides the generated clock signal to each component in the multifunction apparatus 1.

The external interface 27 includes various interfaces, such as a USB, a LAN, a FAX and a TEL (a voice call). The multifunction apparatus 1 is communicable with various external apparatuses through the external interface 27.

The recording head 18 is made to scan in a main scanning direction by a torque of a recording motor MT1, and ejects ink during the scanning to thereby form an image on a recording paper located in an ejecting direction of the ink. Specifically, the multifunction apparatus 1 of the present embodiment controls the recording motor MT1 through the drive control unit 17 to thereby move the recording head 18 in the main scanning direction, while controlling the recording head 18 through the recording control unit 19 to thereby print an image based on image data to be printed on the recording paper.

By continuously printing line images on the recording paper in the above described method while conveying the recording paper in a sub scanning direction, an entire image is formed on the recording paper. Conveyance of the recording paper in the sub scanning direction during image formation may be achieved by the drive control unit 17 controlling a recording conveyance motor MT3 for rotation of a recording paper conveyance roller which holds the recording paper.

In the present embodiment, a recording encoder EN1 (a rotary encoder) is provided to a rotating shaft of the recording motor MT1 and generates a pulse signal each time the recording motor MT1 rotates by a predetermined angle. Also, a recording conveyance encoder EN3 (a rotary encoder) is provided to a rotating shaft of the recording conveyance motor MT3 and generates a pulse signal each time the recording motor MT3 rotates by a predetermined angle.

The multifunction apparatus 1 is configured such that when the recording motor MT1 rotates by a predetermined angle, the recording head 18 is moved by a predetermined distance in the main scanning direction, while when the recording conveyance motor MT3 rotates by a predetermined angle, the recording paper is moved by a predetermined distance in the sub scanning direction.

That is, the multifunction apparatus 1 controls scanning of the recording head 18 and conveyance of the recording paper in accordance with information, which is derived by the encoder processing unit 15 based on the pulse signals outputted from the encoders EN1 and EN3 and indicates conveyance positions of the recording head 18 and the recording paper, and forms an entire image.

The above described function of forming an image on a recording paper is used in the present embodiment for achieving the printer function, the copier function and the facsimile function.

Figure 7:
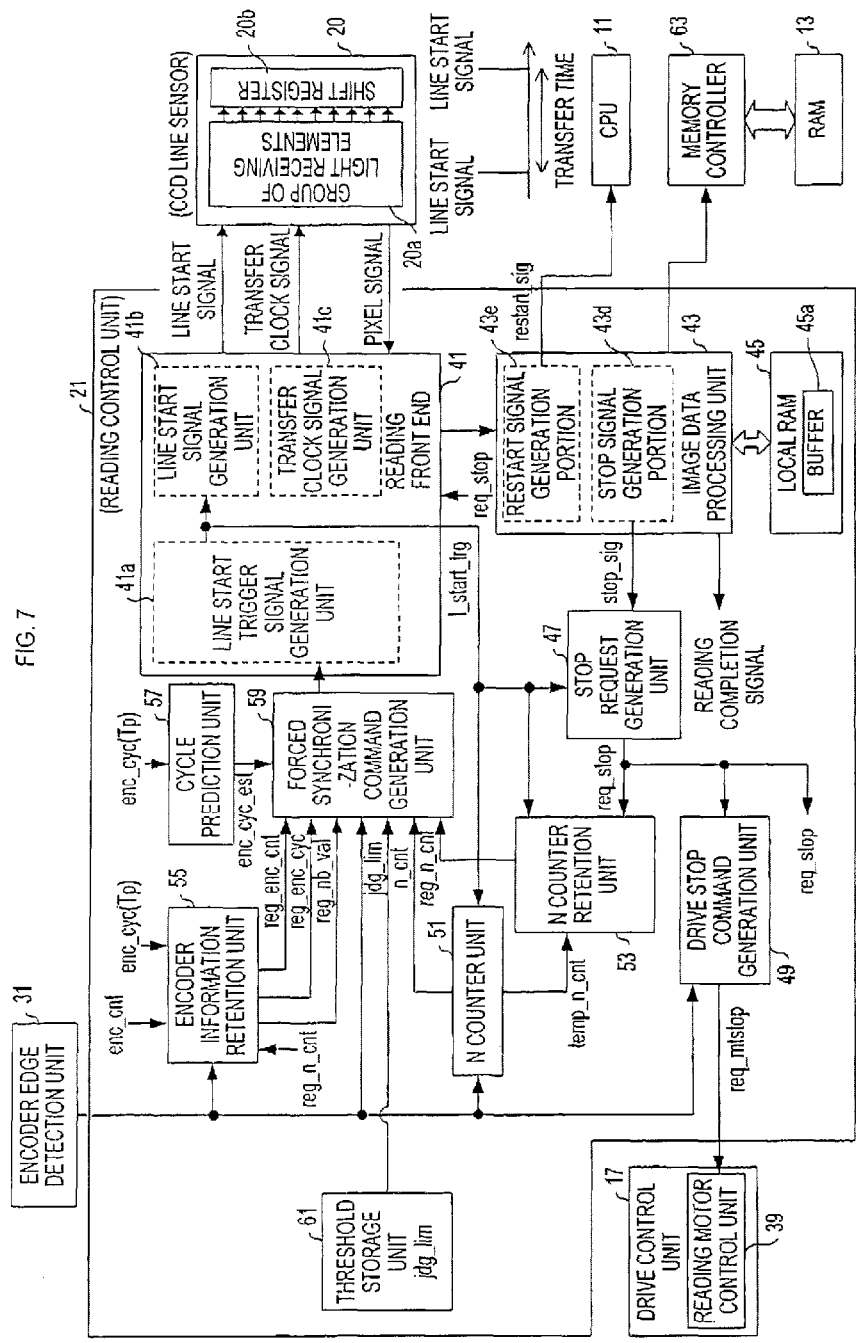
FIG. 7 is a block diagram showing a configuration of a reading control unit.
Figure 8:
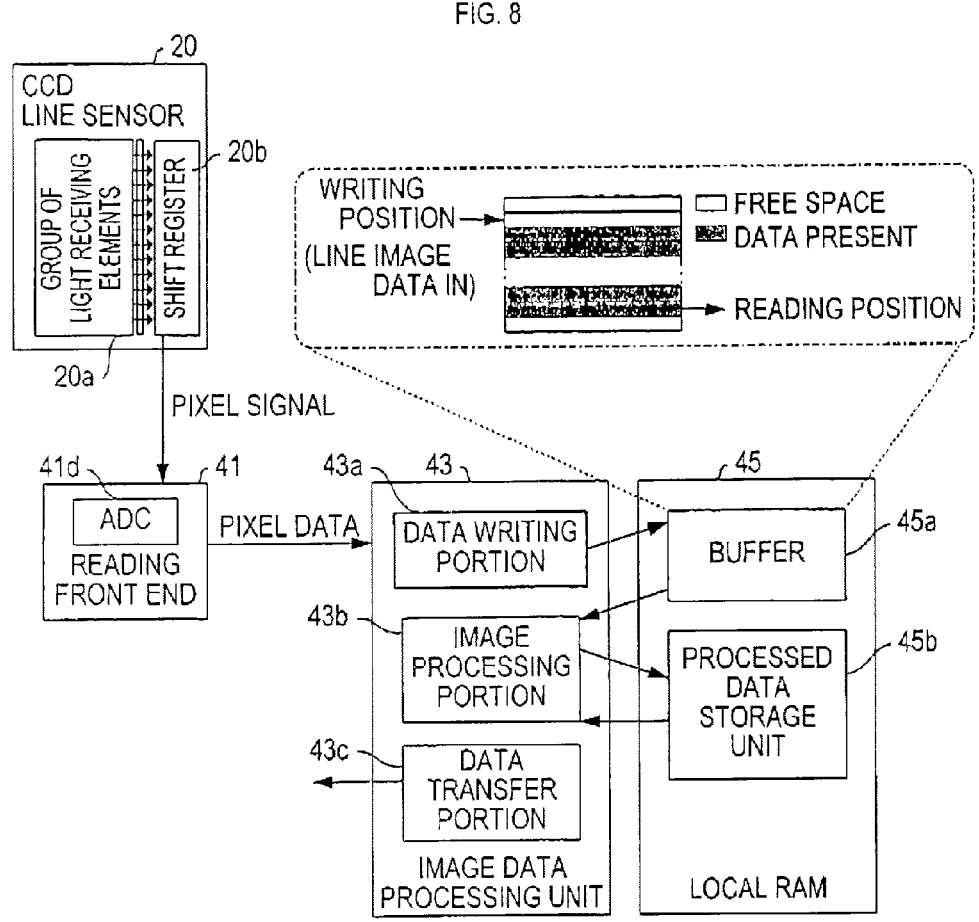
FIG. 8 is an explanatory view illustrating a data processing function achieved by an image data processing unit.

The CCD line sensor 20 in the present embodiment includes a group of light receiving elements (photo diodes) 20a arranged in a line and a CCD analog shift register 20b (see FIG. 7). The CCD line sensor 20 controlled by the reading control unit 21 inputs a signal electric charge (i.e., pixel signals) indicating pixel information collected by the light receiving elements to the CCD analog shift register 20b each time a line start signal is inputted. Then, the CCD line sensor 20 sequentially outputs pixel signals in accordance with transfer clock signals from an output end of the CCD analog shift register 20b during a time period (transfer time in FIG. 7) until a next line start signal is inputted.

The reading control unit 21 controls the CCD line sensor 20 so as to read image information of a reading target which faces the CCD line sensor 20, and converts the pixel signals as reading results outputted from the CCD line sensor 20 into digital pixel data. The reading control unit 21 also arranges the pixel data to generate line image data, and writes the line image data to the RAM 13.

When an automatic conveyance and reading function is in operation in the multifunction apparatus 1, the CCD line sensor 20 is fixed to a predetermined reading position and reads a document which passes the reading position by an operation of an ADF apparatus 150. When a stationary document reading function is in operation in the multifunction apparatus 1, the CCD line sensor 20 is moved in an image reading direction under a platen 102A, on which a document is placed, due to a torque of a reading motor MT2 controlled by the drive control unit 17, and reads image information of the document line by line while being moved.

Figure 2:
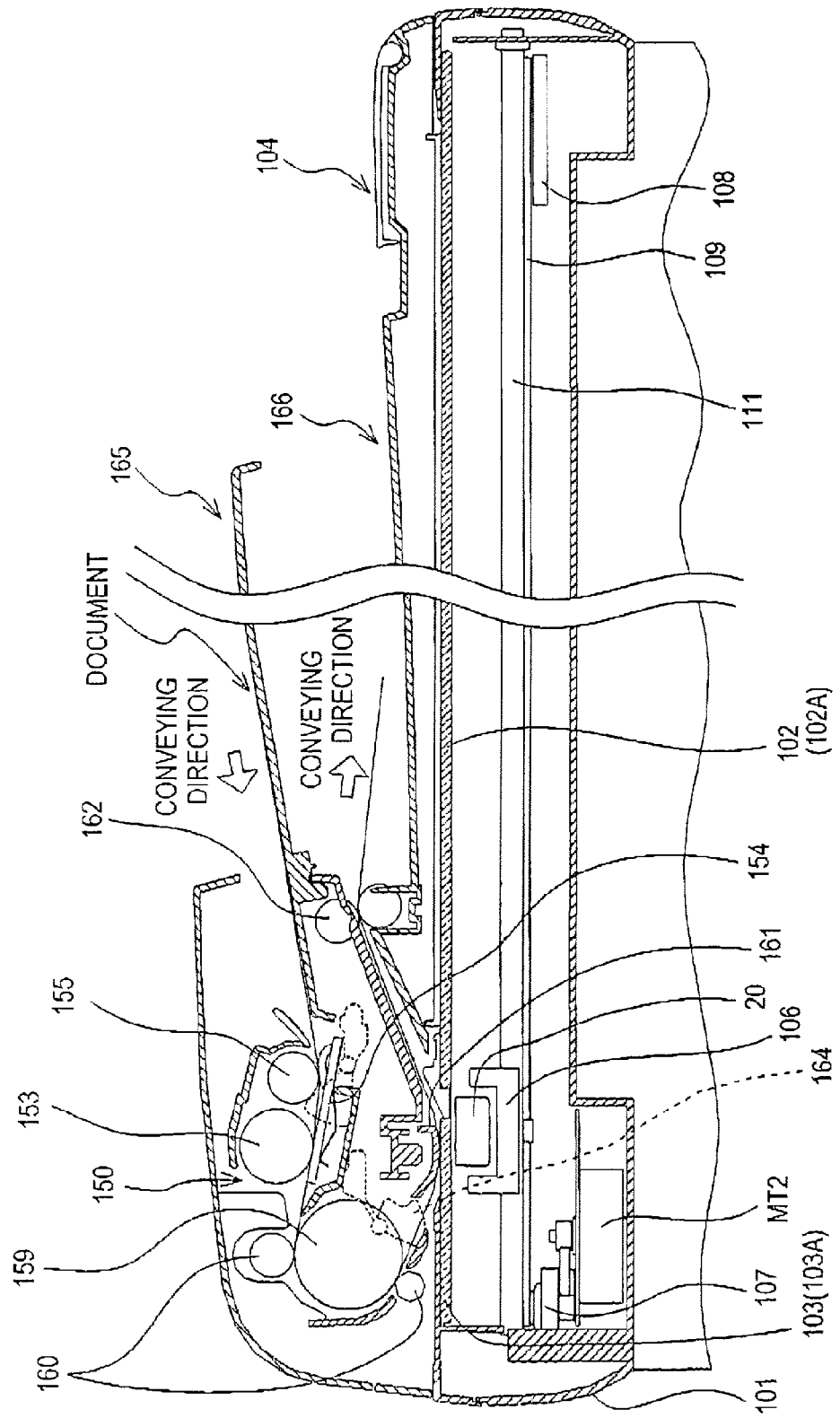
FIG. 2 is a cross-sectional view showing a schematic configuration of a scanner unit and an ADF apparatus.

The reading motor MT2 includes a DC motor. A scanner unit 101 provided in the multifunction apparatus 1 includes an image reading window 102 (hereinafter referred to as a "stationary reading window") used when the stationary document reading function is in operation and an image window 103 (hereinafter referred to as an "automatic reading window") used when the automatic conveyance and reading function is in operation, as shown in FIG. 2. The image reading windows 102 and 103 are closed by respective transparent platens 102A and 103A made of glass, acryl or the like.

A document cover 104 which covers both the image reading windows 102 and 103 is pivotably assembled in an upper surface portion of the scanner unit 101. When document reading is performed through the stationary reading window 102, the document cover 104 is manually opened upward by a user, and a document is placed on the stationary reading window 102.

The CCD line sensor 20 is movably disposed in the scanner unit 101 such that the CCD line sensor 20 receives a light irradiated to and reflected by a document right under the image reading windows 102 and 103, and generates a pixel signal based on the received light. A longitudinal direction (that is, an arrangement direction of the light receiving elements) of the CCD line sensor 20 extends perpendicular to a moving direction of the CCD line sensor 20.

The CCD line sensor 20 is assembled to the scanner unit 101 through a carriage 106 so as to be movable in a longitudinal direction (in a right and left direction in FIG. 2) of the scanner unit 101. The CCD line sensor 20 is stationarily positioned right under the automatic reading window 103 when the automatic conveyance and reading function is in operation, and reads image information of a document passing over the automatic reading window 103 under control of the reading control unit 21. In contrast, when the stationary document reading function is in operation, the CCD line sensor 20 reads image information of a document placed on the platen 102A line by line while being moved at a constant speed right under the stationary reading window 102.

In the present embodiment, the carriage 106 is connected to a belt 109 wound around a driving pulley 107 and a driven pulley 108. The belt 109 is connected to the reading motor MT2 through gears. Specifically, the CCD line sensor 20 receives the torque of the reading motor MT2 through the belt 109, and is guided along a guide shaft 111 disposed in parallel with the belt 109 so as to move linearly in a longitudinal direction of the scanner unit 101.

A reading encoder EN2 provided to a rotating shaft of the reading motor MT2 is constituted as a rotary encoder which outputs a pulse signal (an A-phase signal, a B-phase signal) each time the reading motor MT2 rotates by a predetermined angle. In the multifunction apparatus 1 of the present embodiment, the CCD line sensor 20 is moved by a predetermined distance when the reading motor MT2 rotates by a predetermined angle, and a position of the CCD line sensor 20 is detected by the encoder processing unit 15 based on the pulse signal from the reading encoder EN2. Also, a rotating direction of the reading motor MT2 is detected by the encoder processing unit 15 based on the A-phase signal and the B-phase signal.

The drive control unit 17 controls the reading motor MT2 in accordance with information indicating a moving state of the CCD line sensor 20 obtained by the encoder processing unit 15 based on the pulse signals from the reading encoder EN2, so as to move the CCD line sensor 20 at a constant speed along the guide shaft 111 when the stationary document reading function is in operation.

The ADF apparatus 150 for conveying a reading target document to the automatic reading window 103 is provided in a portion of the document cover 104 corresponding to the automatic reading window 103 and in a vicinity of the portion. When the automatic conveyance and reading function is in operation in the multifunction apparatus 1, sheets of reading target document are placed in a stacked manner on a document tray 165 by the user. The stacked sheets of document placed on the document tray 165 are conveyed to the automatic reading window 103 as a reading position by the operation of the ADF apparatus 150.

Specifically, the ADF apparatus 150, which serves as a separation mechanism for separating the stacked sheets of document sheet by sheet, includes a separation roller 153, a separation pad 154 and a suction roller 155. The separation roller 153 applies conveying force to an uppermost sheet of a plurality of sheets of document stacked in an upper and lower direction. The separation pad 154, which is disposed to face the separation roller 153, contacts the sheet from an opposite side relative to the separation roller 153 and exerts a predetermined conveyance resistance to the sheet. The suction roller 155 sucks the sheets of document stacked on the document tray 165 so as to feed the sheet to the separation roller 153.

The ADF apparatus 160, which also serves as a conveyance mechanism for conveying the sheet separated by the separation mechanism, includes a sheet feed roller 159, a pair of pinch rollers 160, a sheet presser 161, sheet discharge roller 162 and a sheet sensor actuator 164. The sheet feed roller 159 applies conveying force while turning a conveying direction of the sheet separated and conveyed from the separation mechanism toward the image reading window 103. The pinch rollers 160 press the sheet against the sheet feed roller 159.

The sheet presser 161 presses the conveyed sheet against the image reading window 103. When the automatic conveyance and reading function is in operation, the CCD line sensor 20 is located under the sheet presser 161 and reads the sheet passing over the CCD line sensor 20. The sheet sensor actuator 164 is disposed upstream from the sheet presser 161 and detects whether or not the sheet has passed.

In the present embodiment, a conveyance position of the sheet is detected by the encoder processing unit 16 based on an on/off signal from the sheet sensor actuator 164 and a pulse signal from a reading conveyance encoder EN4 provided to a rotating shaft of a reading conveyance motor MT4 which is a DC motor.

In the present embodiment, the above described rollers constituting the ADF apparatus 150 rotate in response to a torque of the reading conveyance motor MT4 to thereby convey the sheet from the document tray 165 to the sheet discharge tray 166.

The reading conveyance encoder EN4 is a rotary encoder which outputs a pulse signal (an A-phase signal, a B-phase signal) each time the reading conveyance motor MT4 rotates by a predetermined angle. The multifunction apparatus 1 is configured such that when the reading conveyance motor MT4 rotates by a predetermined angle, a reading target sheet is moved by a predetermined distance. Specifically, a conveying distance of the sheet is detected based on the pulse signal from the reading conveyance encoder EN4, and a moving direction of the sheet is detected based on the A-phase signal and the B-phase signal by the encoder processing unit 16 in the present embodiment.

In accordance with the detected results, the multifunction apparatus 1 controls conveyance of the sheet through the drive control unit 17 so as to convey the sheet to a reading position at a constant speed and controls the CCD line sensor 20 through the reading control unit 21, and thereby achieves the automatic conveyance and reading function.

The above described reading functions are used for achieving the scanner function, the copier function and the facsimile function.

For example, the stationary document reading function is activated according to a program executed by the CPU 11 when a reading key in the display operation panel 23 is pressed in a state where a document is not placed on the document tray 166. As a result of activation, a document placed on the stationary reading window 102 is read in the multifunction apparatus 1.

The automatic conveyance and reading function is activated according to a program executed by the CPU 11 when a reading key in the display operation panel 23 is pressed in a state where a document is placed on the document tray 165. As a result of activation, the document placed on the document tray 165 is read in the multifunction apparatus 1. The automatic conveyance and reading function is repeatedly activated until an entire document placed on the document tray 165 becomes absent, and image data representing a read image for each document is generated. Whether or not a document is placed on the document tray 165 is determined based on a detection signal from a sensor (not shown) provided to the document tray 165.

[2] Detailed Configuration of Encoder Processing Unit 15 and Drive Control Unit 17

A description will now be provided about the detailed configuration of the encoder processing unit 16 and the drive control unit 17 with reference to FIGS. 4 to 6. In FIG. 4, a set of an encoder edge detection unit 31, a position counter 33 and a cycle counter 35 corresponding to the reading encoder EN2 (the reading conveyance encoder EN4) are indicated as components of the encoder processing unit 15.

[2-1] Configuration of Encoder Processing Unit 15

The encoder processing unit 15 in the present embodiment includes four sets of the encoder edge detection units 31, the position counters 33 and the cycle counters 35 corresponding respectively to the encoders EN1 to EN4.

Rotation amounts (rotation angles) of the motors MT1 to MT4, to which the encoders EN1 to EN4 are respectively provided, and thus moving distances of conveyance targets respectively conveyed by the motors MT1 to MT4 are detected by the respective sets.

Specifically, each of the encoder edge detection units 31 in the encoder processing unit 15 detects a rising edge of corresponding each of the encoders EN1 to EN4, and outputs an edge detection signal each time the rising edge is detected. The edge detection signal is inputted to the position counter 33 and the cycle counter 35 of the corresponding set.

An edge detection signal outputted from the encoder edge detection unit 31 for the reading encoder EN2, to which a pulse signal (an encoder signal) from the reading encoder EN2 is inputted, is inputted to the position counter 33 and the cycle counter 35 for the reading encoder EN2. While the stationary document reading function is in operation, the edge detection signal is also inputted to an encoder information retention unit 55 included in the reading control unit 21, a drive stop command generation unit 49, a forced synchronization command generation unit 59 and an N-counter unit 51.

A value enc_cnt outputted from the position counter 33 for the reading encoder EN2 and values enc_cyc and Tp outputted from the cycle counter 35 for the reading encoder EN2 are inputted to the reading motor control unit 39 for controlling the reading motor MT2 and the reading conveyance motor MT4 in the drive control unit 17, and is also inputted to the encoder information retention unit 55 when the stationary document reading function is in operation. The value enc_cyc and Tp outputted from the cycle counter 35 for the reading encoder EN2 is also inputted to a cycle prediction unit 57 in the reading control unit 21 when the stationary document reading function is in operation.

An edge detection signal outputted from the encoder edge detection unit 31 for the reading conveyance encoder EN4, to which a pulse signal from the reading conveyance encoder EN4 is inputted, is inputted to the position counter 33 and the cycle counter 35 for the reading conveyance encoder EN4. When the automatic conveyance and reading function is in operation, the edge detection signal is also inputted to the encoder information retention unit 55 in the reading control unit 21, the drive stop command generation unit 49, the forced synchronization command generation unit 59 and the N-counter unit 51.

A value enc_cnt outputted from the position counter 33 for the reading conveyance encoder EN4, and values enc_cyc and Tp outputted from the cycle counter 35 for the reading conveyance encoder EN4 are inputted to the reading motor control unit 39 in the drive control unit 17, and is also inputted to the encoder information retention unit 55 in the reading control unit 21 when the automatic conveyance and reading function is in operation. The value enc_cyc and Tp outputted from the cycle counter 35 for the reading conveyance encoder EN4 are also inputted to a cycle prediction unit 57 in the reading control unit 21 when the automatic conveyance and reading function is in operation.

Figure 5A:
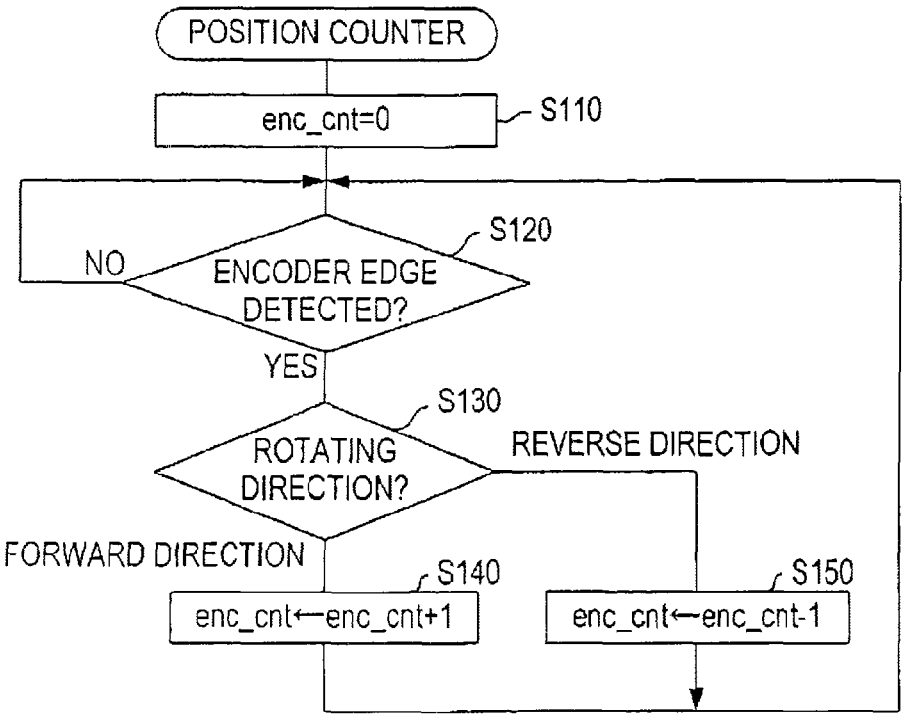
FIG. 5A is a flowchart showing a process performed by a position counter.

The position counter 33 starts a process shown in FIG. 5A when the reading function is activated, and continuously updates the value enc_cnt. Although a description will be provided below with respect to the process performed by the position counter 33 for the reading encoder EN2 using FIG. 5A, the same process as performed by the position counter 33 for the reading encoder EN2 is performed by the position counter 33 for each of the other encoders.

When the process shown in FIG. 5A is started by the position counter 33 for the reading encoder EN2, a variable enc_cnt is reset to zero (S110). Then, the present process waits for an input of an edge detection signal from the encoder edge detection unit 31 for the reading encoder EN2 (S120).

When the edge detection signal is inputted, a rotating direction of the corresponding reading motor MT2 is determined (S130). When it is determined that the rotating direction of the reading motor MT2 is a forward direction, the variable enc_cnt is incremented by "1" (S140), and the present process proceeds to S120. When it is determined that the rotating direction of the reading motor MT2 is a reverse direction, the variable enc_cnt is decremented by "1" (S150), and the present process proceeds to S120.

That is, the position counter 33 performs a process of counting up the variable enc_cnt each time an edge signal is inputted when the reading motor MT2 rotates in the forward direction, and counting down the variable enc_cnt each time an edge signal is inputted when the reading motor MT2 rotates in the reverse direction. Thus, a position of the CCD line sensor 20 is detected by the position counter 33 for the reading encoder EN2.

Figure 5B:
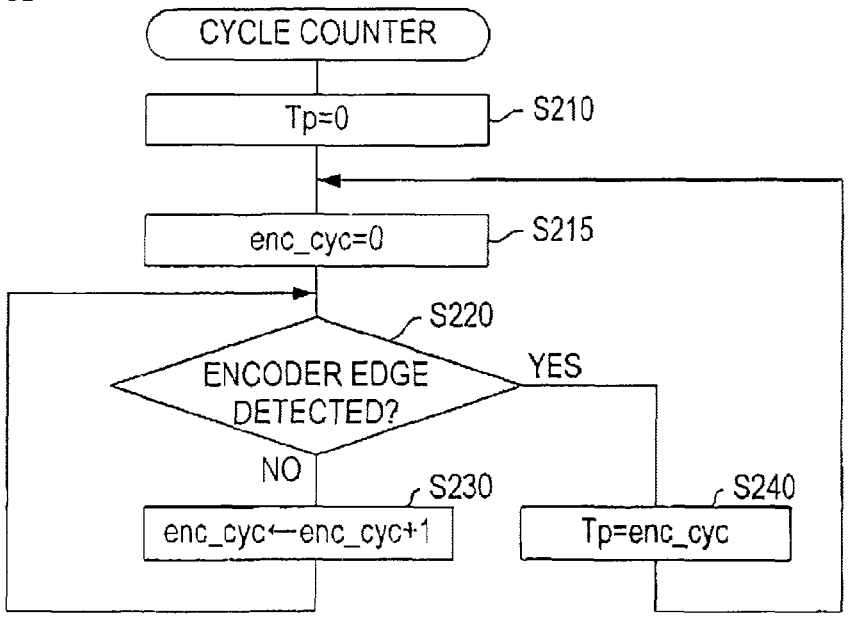
FIG. 5B is a flowchart showing a process performed by a cycle counter.

The cycle counter 35 starts a process shown in FIG. 5B when the reading function is activated, and continuously updates the value enc_cyc and Tp. Although a description will be provided below with respect to the process performed by the cycle counter 35 for the reading encoder EN2 using FIG. 5B, the same process as performed by the cycle counter 35 for the reading encoder EN2 is performed by the cycle counter 35 for each of the other encoders.

When the process shown in FIG. 5B is started by the cycle counter 35 for the reading encoder EN2, a variable Tp is reset to zero (S210) and a variable enc_cyc is reset to zero (S215). Then, it is determined whether or not an edge detection signal has been inputted from the encoder edge detection unit 31 for the reading encoder EN2 (S220).

When it is determined that an edge detection signal has not been inputted (S220: No), the variable enc_cyc is incremented by "1" (S230), and the present process proceeds to S220. When it is determined that an edge detection signal is inputted (S220: Yes), the variable Tp is set to a current value of the variable enc_cyc (S240), and the present process proceeds to S215.

In the above described operation, the cycle counter 35 measures a time period during which an edge detection signal is not inputted. Specifically, the cycle counter 35, which operates synchronized with the clock signal inputted from the clock generation unit 25, counts up the variable enc_cyc at a cycle of the clock signal to thereby measure an elapsed time from a time point when an edge detection signal is inputted last time. When an edge detection signal is inputted next time, an elapsed time enc_cyc from the time point of a last input of the edge detection signal until the time point of a current input of the edge detection signal, i.e., is outputted as the value Tp (S240). According to the operation as above, the cycle counter 35 for the reading encoder EN2 detects a time required for the reading motor MT2 to rotate a predetermined angle and thus detects a moving time of the CCD line sensor 20 per predetermined unit distance.

[2.2] Detailed Configuration of Drive Control Unit 17

A description will now be provided on a configuration of the drive control unit 17. The drive control unit 17 includes the reading motor control unit 39 for controlling the reading motor MT2 and the reading conveyance motor MT4 through a driving circuit 37, as shown in FIG. 4, and a recording motor control unit (not shown) for controlling the recording motor MT1 and the recording conveyance motor MT3 through a driving circuit. These motor control units control the motors MT1 to MT4 to be controlled in accordance with the outputs enc_cnt, enc_cyc and Tp of the position counters 33 and the cycle counters 35 corresponding, respectively, to the encoders provided to the motors MT1 to MT4 to be controlled.

Specifically, the reading motor control unit 39 controls the reading motor MT2 in accordance with values enc_cnt, enc_cyc and Tp from the position counter 33 and the cycle counter 35 for the reading encoder EN2 included in the encoder processing unit 15. The reading motor control unit 39 also controls the reading conveyance motor MT4 in accordance with values enc_cnt, enc_cyc and Tp from the position counter 33 and the cycle counter 35 for the reading conveyance encoder EN4.

More specifically, when the reading function is activated, the reading motor control unit 39 selects one of the reading motor MT2 and the reading conveyance motor MT4 as a control target and control the selected control target and starts executing a process shown in FIG. 6 in response to a command from the CPU 11. The reading motor MT2 is selected as the control target when the stationary document reading function is activated, while the reading conveyance motor MT4 is selected as the control target when an automatic conveyance and reading function is activated.

In a case of terminating the process shown in FIG. 6 in accordance with a req_mtstop signal before completion of reading of a reading target, the reading motor control unit 39 restarts executing the process shown in FIG. 6 only when a reading restart command is inputted from the CPU 11.

When the process shown in FIG. 6 is started by the reading motor control unit 39, a motor drive setting is performed (S310). That is, a motor rotating direction is set to a forward direction (the image reading direction), and a target rotating speed of the motor is set depending on a reading resolution.

Subsequently, the reading motor control unit 39 controls the control target motor in accordance with details of the motor drive setting performed in S310 (S320). Specifically in S320, rotation of the motor is accelerated up to near the target rotating speed, and then the motor is controlled such that a rotating speed of the motor equals the target rotating speed regardless of a conveyance load. In the present embodiment, a conveyance target is moved at a constant speed as described above.

While the motor is controlled, it is determined whether or not a reading completion signal (later described in detail) has been inputted (S330). When it is determined that a reading completion signal has not been inputted, it is determined whether or not a value of the req_mtstop signal inputted from the drive stop command generation unit 49 is "1" (S340).

When it is determined that a reading completion signal has not been inputted (S330: No) and the value of the req_mtstop signal is not "1" (S340: No), the control of the motor is continuously performed while determinations in S330 and S340 are repeatedly performed.

When the value of the req_mtstop signal is changed to "1", a process to decelerate and stop the control target motor is performed (S350). After the motor is stopped, a motor drive setting is performed to set the motor rotating direction to a reverse direction opposite to the image reading direction, and a target rotating speed and a rotating time of the motor are also set to predetermined values (S360).

A value necessary for rotating the motor by a predetermined rotation amount is previously determined in a design stage in the present embodiment as the target rotating speed and the rotating time of the motor. The predetermined rotation amount is obtained by adding a motor rotation amount necessary and sufficient to converge the motor to the target rotating speed in S320 on a maximum value of the rotation amount required to decelerate and stop the motor in S350.

Subsequently, the reading motor control unit 39 causes the motor to rotate in the reverse direction for a predetermined time in accordance with setting details at the time of the drive setting (S370). As a result of this operation, the conveyance target (the CCD line sensor 20 or the reading target document) conveyed by the torque of the motor is retreated by a distance which is sufficient for acceleration from a point located when the value of the req_mtstop signal is changed to "1" (more particularly, a point located when the value of the req_stop signal is changed to "1"). When rotation and stop of the motor in S 370 is completed, the present process is terminated.

When it is determined that a reading completion signal has been inputted (S330: Yes), it is determined whether or not the reading function in operation during the reading is the stationary document reading function (S380).

When it is determined that the reading function is the stationary document reading function (S380: Yes), a process to decelerate and stop the control target motor is performed (S390). After the motor is stopped, a motor drive setting is performed to set the motor rotating direction to the reverse direction to the image reading direction (S400).

Subsequently, the control target motor (the reading motor MT2) is driven such that the conveyance target (the CCD line sensor 20) is conveyed to a home position (S410), and the present process is terminated. The home position of the CCD line sensor 20 is set to a fixed position of the CCD line sensor 20 during operation of the automatic conveyance and reading function in the present embodiment.

When it is determined that the reading function in operation during the reading is not the stationary document reading function but the automatic conveyance and reading function (S380: No), the control target motor (the reading conveyance motor MT4) is driven until a document during conveyance is discharged to a paper discharge tray 166 (S420).

When discharge of the document is completed, rotation of the motor is stopped (S420), and the present process is terminated.

[3] Detailed Configuration of Reading Control Unit 21

A description will now be provided about the detailed configuration of the reading control unit 21.

As shown in FIG. 7, the reading control unit 21 provided in the multifunction apparatus 1 of the present embodiment includes a reading front end 41, an image data processing unit 43, a local ROM 45, a stop request generation unit 47, the drive stop command generation unit 49, the N counter unit 51, an N counter retention unit 53, and the encoder information retention unit 55, the cycle prediction unit 57, a forced synchronization command generation unit 59 and a threshold storage unit 61. The reading control unit 21 achieves a reading control characteristic of the present invention using these components. Descriptions will now be provided below on details of the respective components.

[3.1] Details of Reading Front End 41

The reading front end 41 included in the reading control unit 21 of the present embodiment is connected to the CCD line sensor 20. The reading front end 41 inputs a control signal to the CCD line sensor 20, receives pixel signals as reading results inputted from the CCD line sensor 20, and performs processing of the pixel signal.

The reading front end 41 includes a line start trigger signal generation unit 41a, a line start signal generation unit 41b and a transfer clock signal generation unit 41c. The reading front end 41 periodically generates a line start trigger (I_start_trg) signal in the line start trigger signal generation unit 41a, and inputs a line start signal for specifying a reading timing of a line image to the CCD line sensor 20, based on the line start trigger signal.

Specifically, the line start trigger signal, which is a signal for specifying an output timing of the line start signal, is generated by the line start trigger signal generation unit 41a in an input cycle of the line start signal to be inputted to the CCD line sensor 20, and is inputted to the line start signal generation unit 41b.

The line start trigger signal generation unit 41a starts outputting a line start trigger signal when the reading function is activated, and subsequently periodically outputs a line start trigger signal. When stopping outputting a line start trigger signal before completion of reading of a reading target, the line start trigger signal generation unit 41a is changed to a synchronization command waiting state, and waits until receiving a synchronization command from the forced synchronization command generation unit 59.

Upon receiving a synchronization command from the forced synchronization command generation unit 59, the line start trigger signal generation unit 41a restarts outputting a line start trigger signal, and subsequently periodically outputs a line start trigger signal.

The line start signal generation unit 41b inputs a line start signal having a specified cycle, which is acceptable to the CCD line sensor 20, to the CCD line sensor 20 at an input timing of a line start trigger signal. When the line start signal is inputted to the CCD line sensor 20, a signal electric charge accumulated in the light receiving elements is inputted to the CCD analog shift register 20b in the CCD line sensor 20, and thereby image information read before the line start signal is inputted is stored in the CCD analog shift register 20b. At this timing, the signal electric charge is reset in the light receiving elements, and a new reading operation using a photoelectric effect is performed.

Figure 3:
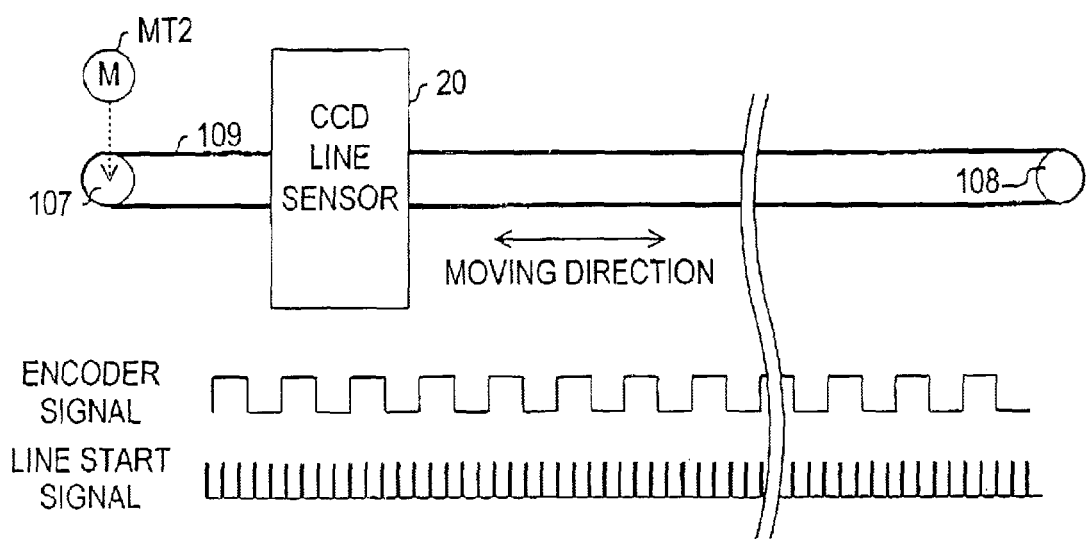
FIG. 3 is an explanatory view illustrating a state of movement of a CCD line sensor.

In the present embodiment, the resolution performance of each of the encoders EN2 and EN4 is set lower than the reading resolution by the scanner function in order to achieve a lower product manufacturing cost. As a result, a line start signal having a shorter cycle than cycles of the pulse signals outputted from the encoders EN2 and EN4 is inputted to the CCD line sensor 20 while the conveyance target (the CCD line sensor 20 or the reading target) is moved at a constant speed by the operation of the reading motor control unit 39, asynchronously with the pulse signals outputted from the encoders EN2 and EN4 (see FIG. 3).

The transfer clock signal generation unit 41c generates transfer clock signals for causing the CCD analog shift register 20b to output pixel signals. The transfer clock signals are inputted to the CCD line sensor 20. When one of the transfer clock signals is inputted, pixel information for one line stored in the CCD analog shift register 20b is outputted in series, as pixel signals, from the CCD analog shift register 20b during a period until a next line start signal is inputted.

The pixel signals inputted from the CCD analog shift register 20b to the reading front end 41 are converted into digital pixel data by an A/D (analog/digital) converter 41d included in the reading front end 41. The pixel data for one line is arranged in a serial manner and is transferred as line image data to the image data processing unit 43.

The reading front end 41 configured as above inputs the line start trigger signal outputted from the line start trigger signal generation unit 41a to the stop request generation unit 47, the N counter unit 51 and the N counter retention unit 53. When the value of the req_stop signal is changed from "1" to zero, the reading front end 41 stops outputting the line start trigger signal, the line start signal and the transfer clock signal.

Subsequently, when the forced synchronization command from the forced synchronization command generation unit 59 is inputted, the reading front end 41 restarts outputting of the line start trigger signal, the line start signal and the transfer clock signal.

[3.2] Details of Image Data Processing Unit 43

A description will now be provided on details of the image data processing unit 43 with reference to FIGS. 7-10. The image data processing unit 43 in the present embodiment has a data processing function. Specifically, the image data processing unit 43 sequentially writes line image data inputted from the reading front end 41 to a buffer 45a as a FIFO memory provided in the local RAM 45, performs image processing, such as shading correction and gamma correction, against each line image data stored in the buffer 45a, and writes the each line image data after the image processing to the RAM 13 through a memory controller 63.

The image data processing unit 43 also has a stop-restart control function. Specifically, the image data processing unit 43 outputs a stop_sig signal for temporarily stopping transfer of the line image data from the reading front end 41 and outputs a restart_sig signal for restarting transfer of the line image data in accordance with a free space of the buffer 45a.

The image data processing unit 43 includes a data writing portion 43a, an image processing portion 43b and a data transfer portion 43c in order to achieve the data processing function. Each time line image data as image data for one line is inputted from the reading front end 41, the image data processing unit 43 writes the line image data to the buffer 45a through the data writing portion 43a.

The image data processing unit 43 reads line image data stored in a reading position of the buffer 45a, performs image processing, such as shading correction and gamma correction, against the line image data, and temporarily stores the line image data after the image processing in a processed data storage unit 45b in the local RAM 45 through the image processing portion 43b. The image data processing unit 43 writes the line image data stored in the processed data storage unit 45b to the RAM 13 through the data transfer portion 43c to thereby create image data representing a read image on the RAM 13.

Function blocks in the image data processing unit 43 shown in FIG. 7 indicate function blocks regarding the above-mentioned stop-restart control function.

As shown in FIG. 7, the image data processing unit 43 of the present embodiment includes a stop signal generation portion 43d that outputs a stop_sig signal and a restart signal generation portion 43e that outputs a restart_sig signal. The image data processing unit 43 specifically starts a process shown in FIG. 9 when the reading function is activated and changes a state of a stop_sig signal to be outputted in operation.

Figure 9:
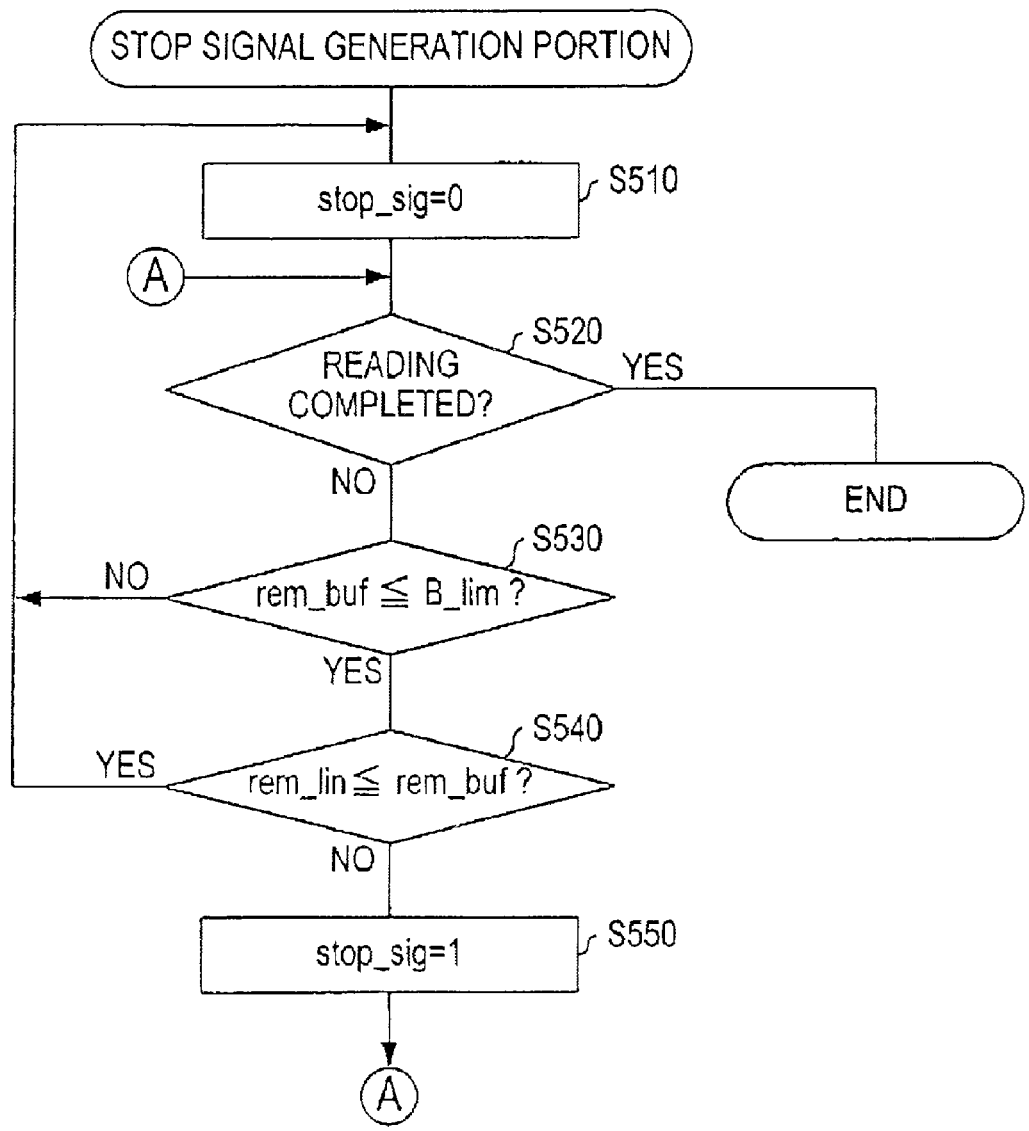
FIG. 9 is a flowchart showing a process performed by a stop signal generation portion.

When the process shown in FIG. 9 is started by the stop signal generation portion 43d, a value of the stop_sig signal is first set to zero (S510).

Then, it is determined whether or not acquisition of line image data up to a reading completion line has been completed based on a number of lines of the line image data inputted from the reading front end 41 (S520).

When it is determined that acquisition of line image data up to the reading completion line has been completed (S520: Yes), output of the stop_sig signal is stopped. In a case where acquisition of line image data up to the reading completion line has been completed, the stop signal generation portion 43d outputs a reading completion signal to notify respective components of the completion of reading.

When it is determined that acquisition of line image data up to the reading completion line has not been completed (S520: No), it is determined whether or not an amount of free space rem_buf of the buffer 45a is equal to or smaller than a predetermined threshold value B_lim (S530).

When it is determined that the amount of free space rem_buf of the buffer 45a is not equal to or smaller than the predetermined threshold value B_lim (S530: No), the amount of free space is regarded as sufficient for writing the line image data, and the present process returns to S510. In S510, a value of the stop_sig signal is set to zero.

When it is determined that the amount of free space rem_buf of the buffer 45a is equal to or smaller than the predetermined threshold value B_lim (S530: Yes), it is determined whether or not a total amount rem_lin of line image data up to the reading completion lines which should be subsequently written, is equal to or smaller than the amount of free space rem_buf of the buffer 45a (S540).

When it is determined that the total amount rem_lin is equal to or smaller than the amount of free space rem_buf (S540: Yes), it is regarded that the buffer 45a will not be filled up before completion of reading, and the present process returns to S510. In S510, the value of the stop_sig signal is set to zero to perform control such that output of the line image data from the reading front end 41 is not stopped.

When it is determined that the total amount rem_lin is larger than the amount of free space rem_buf (S540: No), the value of the stop_sig signal is set to "1" such that output of the line image data from the reading front end 41 is stopped (S550). Then, the present process returns to S520.

The stop_sig signal the state of which may be changed as described above is inputted to the stop request generation unit 47.

Figure 10:
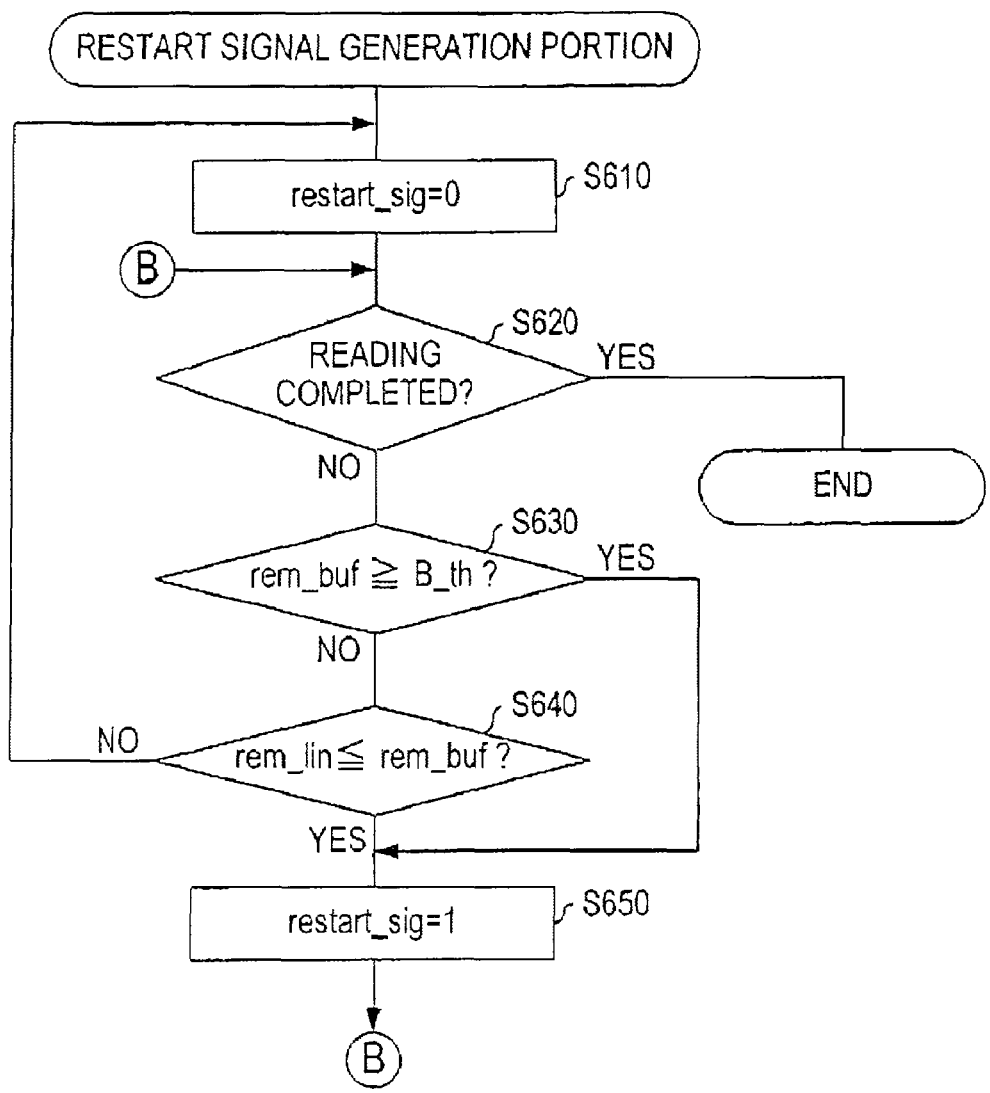
FIG. 10 is a flowchart showing a process performed by a restart signal generation portion.

The restart signal generation portion 43e specifically starts a process shown in FIG. 10 when the reading function is activated and changes a state of the restart_sig signal in operation.

When the process shown in FIG. 10 is started by the restart signal generation portion 43e, the value of the restart_sig signal is first set to zero (S610).

Then, it is determined whether or not acquisition of line image data up to a reading completion line has been completed based on a number of lines of the line image data inputted from the reading front end 41 (S620).

When it is determined that acquisition of line image data up to the reading completion line has been completed (S620: Yes), output of the restart_sig signal is stopped.

When it is determined that acquisition of line image data up to the reading completion line has not been completed (S620: No), it is determined whether or not an amount of free space rem_buf of the buffer 45a is equal to or larger than a predetermined threshold value B_th (S630).

When it is determined that the amount of free space rem_buf is equal to or larger than the predetermined threshold value B_th (S630: Yes), the amount of free space rem_buf is regarded as sufficient for restart, and the value of the restart_sig signal is set to "1" (S650), and the present process returns to S620. Here, the threshold value B_th is set to a value larger than the threshold value B_lim (B_th>B_lim).

When it is determined that the amount of free space rem_buf is smaller than the threshold value B_th (S630: No), it is determined whether or not the amount of free space rem_buf of the buffer 45a is equal to or larger than a total amount rem_lin of line image data up to the reading completion line, which should be subsequently written (S640).

When it is determined that the amount of free space rem_buf is equal to or larger than the total amount rem_lin (S640: Yes), it is regarded that the amount of free space rem_buf is sufficient for restart, and the value of the restart_sig signal is set to "1" (S650). Then, the present process returns to S620.

When it is determined that the amount of free space rem_buf is not equal to or larger than the threshold value B_th, or equal to or larger than the total amount rem_lin (S630: No, S640: No), the amount of free space rem_buf is regarded as insufficient for restart. The present process returns to S610, and the value of the restart_sig signal is set to zero. Then, the present process proceeds to S620.

The restart_sig signal whose state is changed as described above is inputted to the CPU 11. The CPU 11, which continuously monitoring the restart_sig signal, inputs a reading restart command to the reading motor control unit 39 when the value of the restart_sig signal is changed from zero to "1" to cause the reading motor control unit 39 to perform the process shown in FIG. 6 from S310. The CPU 11 also inputs reading restart commands to the encoder information retention unit 55 and the forced synchronization command generation unit 59 to thereby activate the encoder information retention unit 55 and the forced synchronization command generation unit 59, respectively.

[3.3] Details of Stop Request Generation Unit 47

Figure 11:
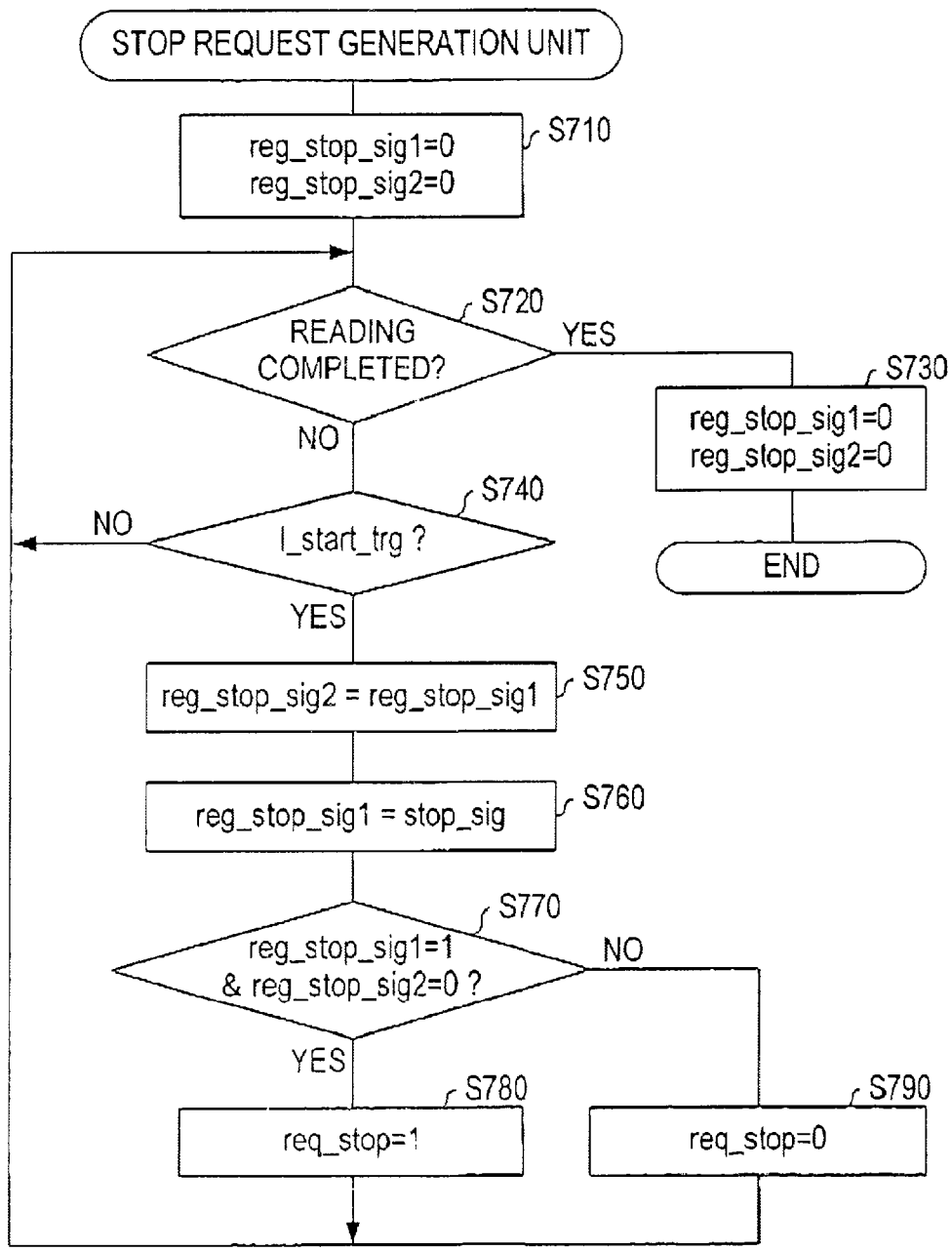
FIG. 11 is a flowchart showing a process performed by a stop request generation unit.

A description will now be provided on details of the stop request generation unit 47 with reference to FIG. 11.

The stop request generation unit 47 configured to output a req_stop signal starts a process shown in FIG. 11 when the reading function is activated, and changes a state of the req_stop signal in accordance with a stop_sig signal outputted from the stop signal generation portion 43d in operation.

When the process is started by the stop request generation unit 47, a variable reg_stop_sig1 is set to zero, and a variable reg_stop_sig2 is set to zero (S710).

Subsequently, it is determined whether or not a reading completion signal has been inputted from the image data processing unit 43 to thereby determine whether or not reading of a reading target (reading of a sheet of document) has been completed (S720).

When it is determined that the reading has been completed (S720: Yes), the variable reg_stop_sig1 is set to zero and the variable reg_stop_sig2 is also set to zero (S730) again, and the present process is terminated.

When it is determined that the reading has not been completed (S720: No), the present process waits for completion of the reading or an input of a line trigger signal. When a line trigger signal is inputted (S740: Yes), the variable reg_stop_sig2 is set to the variable reg_stop_sig1 (S750), and the variable reg_stop_sig1 is set to the value of the stop_sig signal ("0" or "1") (S760).

When it is determined that reg_stop_sig1=1 and reg_stop_sig2=0 (S770: Yes), the value of the req_stop signal is set to "1" (S780). When it is determined "No" in S770, the value of the req_stop signal is set to "0" (S790). Then, the present process returns to S720.

Figure 12:
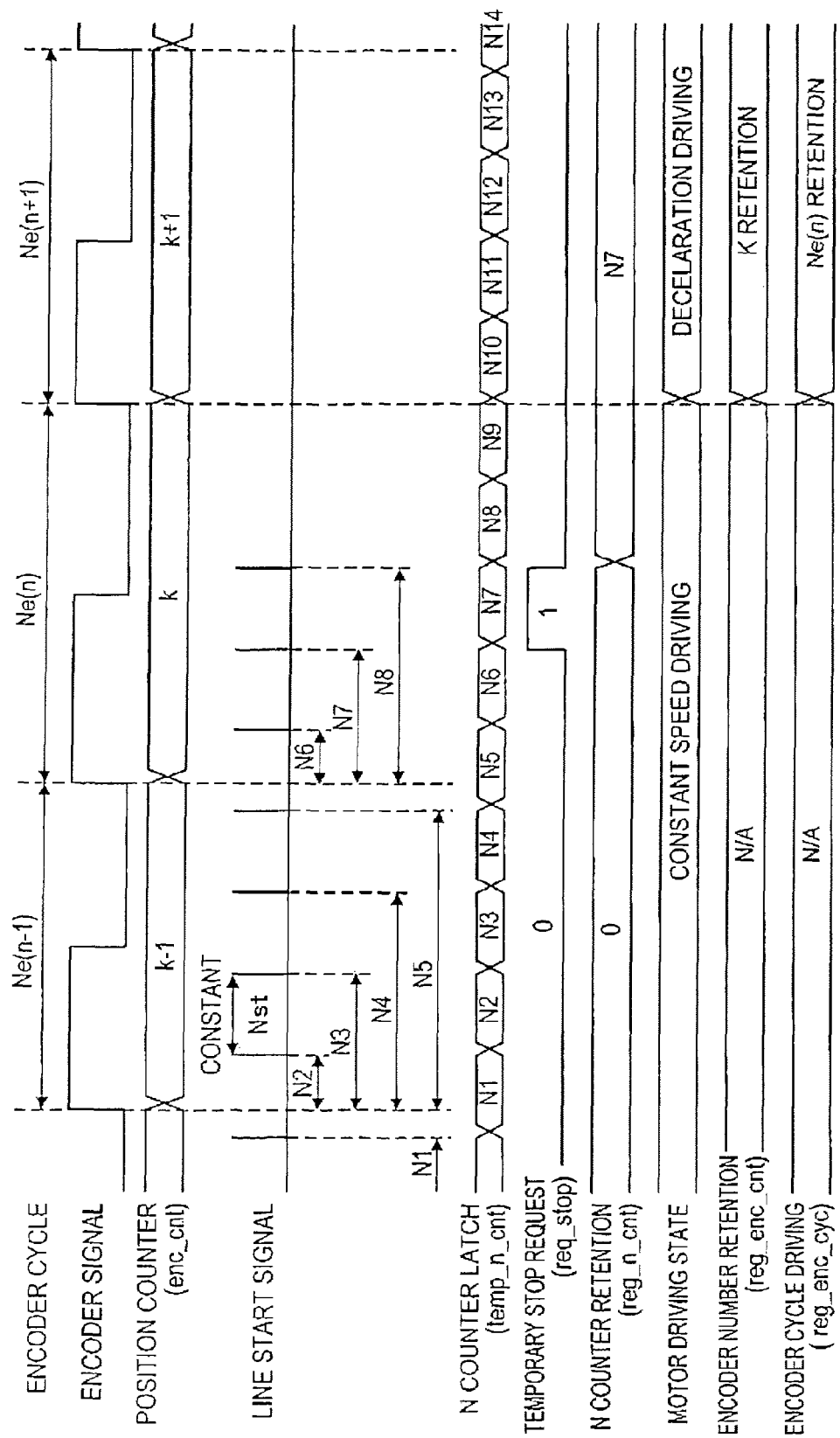
FIG. 12 is a time chart showing states of various signals around a time when a value of a req_stop signal is switched to "1"

According to the present embodiment, as described above, the state of the req_stop signal is changed in synchronization with an output timing of a line start signal, as shown in FIG. 12.

The req_stop signal outputted from the stop request generation unit 47 is inputted to the drive stop command generation unit 49, the N counter retention unit 53, and the reading front end 41.

[3.4] Details of Drive Stop Command Generation Unit 49

A description will now be provided on details of the drive stop command generation unit 49 with reference to FIG. 13.

The drive stop command generation unit 49 configured to output a req_mtstop signal starts a process shown in FIG. 13 when the reading function is activated, and changes a state of the req_mtstop signal in accordance with the req_stop signal inputted from the stop request generation unit 47 in operation.

When the process is started by the drive stop command generation unit 49, the value of the req_mtstop signal is set to zero (S810).

Subsequently, it is determined whether or not a reading completion signal has been inputted from the image data processing unit 43 to thereby determine whether or not reading of a reading target (reading of a sheet of document) has been completed (S820).

When it is determined that the reading has been completed (S820: Yes), the value of the req_mtstop signal is again set to zero (S830), and the present process is terminated.

When it is determined that the reading has not been completed (S820: No), the value of the req_mtstop signal is maintained at zero until the reading is completed or the value of the req_stop signal inputted is changed to "1". When it is determined that the req_stop signal is changed to "1" (S840: Yes), and that an edge detection signal is inputted (S850: Yes), the value of the req_mtstop signal is set to "1" (S860). Then, the present process returns to S820.

When the value of the req_mtstop signal is changed to "1", the reading motor control unit 39 decelerates the motor. Since the state of the req_mtstop signal is changed in synchronization with the edge detection signal, deceleration control of the motor by the reading motor control unit 39 is started, as shown in FIG. 12, when the edge detection signal is inputted from the encoder after the value of the req_stop signal is changed to "1".

[3.5] Details of N Counter Unit 51

Figure 14A:
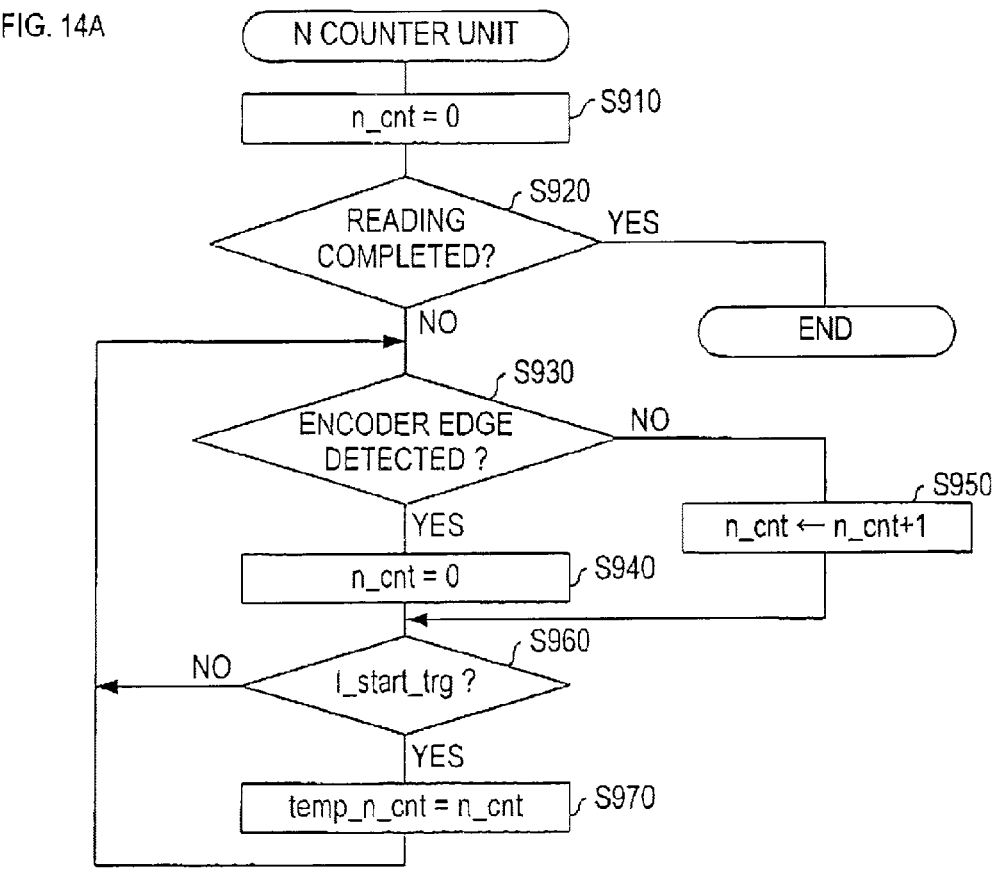
FIG. 14A is a flowchart showing a process performed by an N counter unit.

A description will now be provided on details of the N counter unit 61 with reference to FIG. 14A.

The N counter unit 51 configured to output values of a variable n_cnt and a variable temp_n_cnt starts a process shown in FIG. 14A when the reading function is activated, and calculates values of the variable n_cnt and the variable temp_n_cnt in operation.

When the process is started by the N counter unit 51, the variable n_cnt is set to zero (S910).

Subsequently, it is determined whether or not a reading completion signal has been inputted from the image data processing unit 43, to thereby determine whether or not reading of a reading target (reading of a sheet of document) has been completed (S920).

When it is determined that the reading has been completed (S920: Yes), the present process is terminated.

When it is determined that the reading has not been completed (S920: No), it is determined whether or not an edge detection signal has been inputted (S930). When it is determined that an edge detection signal has been inputted, the variable n_cnt is set to zero (S940). When it is determined that an edge detection signal has not been inputted, the value of the variable n_cnt is incremented by "1" (S950).

When it is determined that a line start trigger signal has not been inputted (S960: No), the present process returns to S930. Then, the variable n_cnt is continuously counted up until a next edge detection signal is inputted (S950). When the next edge detection signal is inputted, the value of the variable n_cnt is reset (S940).

When it is determined that a line start trigger signal has been inputted (S960: Yes), the variable temp_n_cnt is set to the value n_cnt to thereby retain the value of the variable n_cnt counted up since an input of a last edge detection signal until an input of the line start trigger signal as the value of the variable temp_n_cnt (S970). Then, the present process returns to S930, and the above described operation is performed.

The N counter unit 51 operates in synchronization with a clock signal inputted from the clock generation unit 25 and counts up the variable n_cnt at a cycle of the clock signal (S950). Specifically, an elapsed time (each of N1 to N14 shown in FIG. 12) from the time of a last input of an edge detection signal until the time of an input of a line start trigger signal is measured in the N counter unit 51, and the measured elapsed time is outputted as the value temp_n_cnt.

[3.6] Details of N Counter Retention Unit 53

Figure 14B:
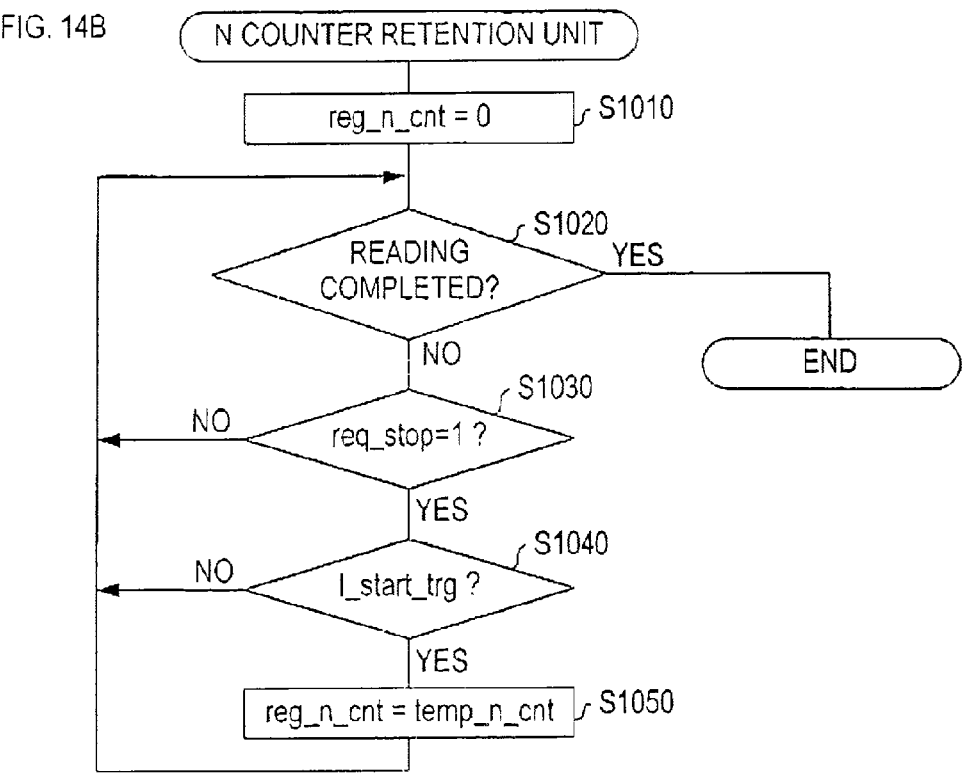
FIG. 14B is a flowchart showing a process performed by an N counter retention unit.

A description will now be provided on details of the N counter retention unit 53 with reference to FIG. 14B.

The N counter retention unit 53 is configured to output a value of a variable reg_n_cnt. The N counter retention unit 53 starts a process shown in FIG. 14B when the reading function is activated, and sequentially updates the value of the variable reg_n_cnt in operation.

When the process shown in FIG. 14B is started by the N counter retention unit 53, the variable reg_n_cnt is set to zero (S1010).

Subsequently, it is determined whether or not a reading completion signal has been inputted from the image data processing unit 43, to thereby determine whether or not reading of a reading target (reading of a sheet of document) has been completed (S1020).

When it is determined that the reading has been completed (S1020: Yes), the present process is terminated.

When it is determined that the reading has not been completed (S1020: No), it is determined whether or not a value of a req_stop signal is "1" (S1030). When it is determined that the value of the req_stop signal is "0" (S1030: No), the present process waits for a change of the req_stop signal to "1" or completion of the reading (S1020).

When it is determined that the value of the req_stop signal is "1" (changed to "1") (S1030: Yes), the present process waits for a next input of a line start trigger signal (S1040) or completion of the reading (S1020). When the next line start trigger signal is inputted (S1040: Yes), the variable reg_n_cnt is set to the value temp_n_cnt obtained from the N counter Unit 51 (S1050).

The above described operation is repeatedly performed by the N counter retention unit 53 until reading is completed. Specifically, as shown in FIG. 12, the value temp_n_cnt outputted from the N counter unit 51 (i.e., the temp_n_cnt set in the N counter unit 51 due to a change of the value of the req_stop signal from 0 to 1 and indicated by N7 in FIG. 12) when the value of the req_stop signal is changed from "1" to "0" is retained as a value of the variable reg_n_cnt.

[3.7] Details of Encoder Information Retention Unit 55

Figure 15:
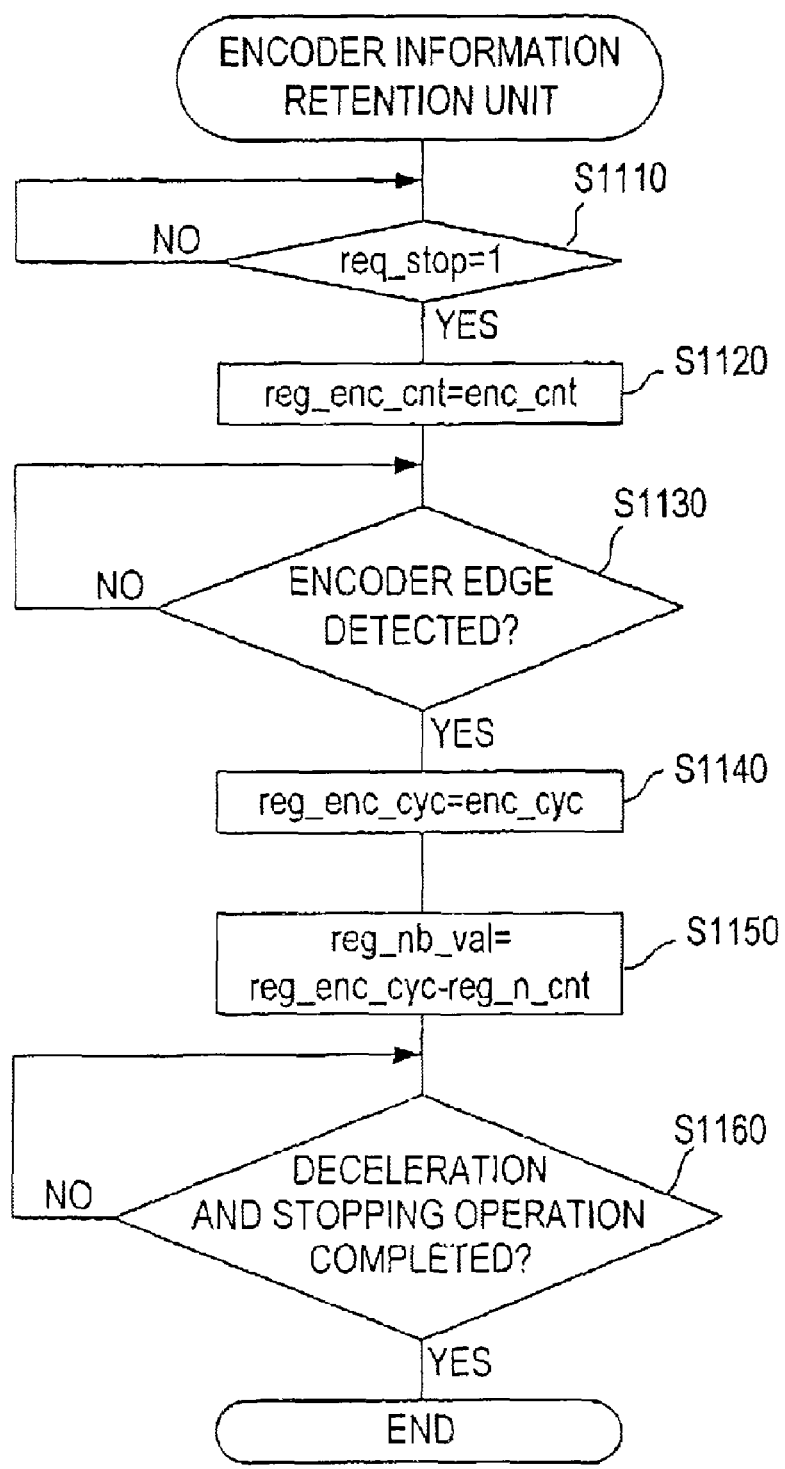
FIG. 15 is a flowchart showing a process performed by an encoder information retention unit.

A description will now be provided on details of the encoder information retention unit 55 with reference to FIG. 15.

The encoder information retention unit 55 configured to retain values outputted from the position counter 33 and the cycle counter 35 of the encoder processing unit 15. The encoder information retention unit 55 starts a process shown in FIG. 15 when the reading function is activated. The encoder information retention unit 55 also starts the process shown in FIG. 15 when a reading restart command is inputted from the CPU 11.

When the process is started by the encoder information retention unit 55, the present process waits for a change of the value of the req_stop signal from 0 to 1 (S1110). When the value of the req_stop signal is changed to 1 (S1110: Yes), a variable reg_enc_cnt is set to a value enc_cnt inputted from the position counter 33 at the time of the change (S1120). Then, the present process waits for an input of an edge detection signal (S1130).

When it is determined that an edge detection signal is inputted (S1130: Yes), a variable reg_enc_cyc is set to a value enc_cyc inputted from the cycle counter 35 (S1140). Also, a variable reg_nb_val is set to a value obtained by subtracting the value reg_n_cnt retained by the N counter retention unit 53 from the value reg_enc_cyc (S1150). Subsequently, the present process waits for stop of the motor by the reading motor control unit 39 (S1160). When it is determined that the motor is stopped (S1160: Yes), the present process is terminated.

As described above, the encoder information retention unit 55 retains a position ("k" indicated in FIG. 12) of a conveyance target indicated by the position counter 33 when the value of the req_stop signal is changed to 1 as the value reg_enc_cnt.

The encoder information retention unit 55 also retains a current encoder cycle (Ne(n) indicated in FIG. 12) outputted from the cycle counter 35 at the time of an input of an edge detection signal immediately after the change of the value of the req_stop signal to 1 as the value req_enc_cyc.

The encoder information retention unit 55 further retains an elapsed time (a value Ne(n)−N7 indicated in FIG. 12) since when the value of the req_stop signal is changed to 1, the same as when a line start (trigger) signal as a cause of change of the value of the req_stop signal to 1 is inputted, until when a next edge detection signal is inputted as the value reg_nb_val.

The encoder information retention unit 55 starts the process shown in FIG. 15 again in accordance with a reading restart command from the CPU 11 while retaining the values reg_enc_cnt, req_enc_cyc and reg_nb_val until the value of the req_stop signal is changed to 1.

[3.8] Details of the Cycle Prediction Unit 57

Figure 16A:
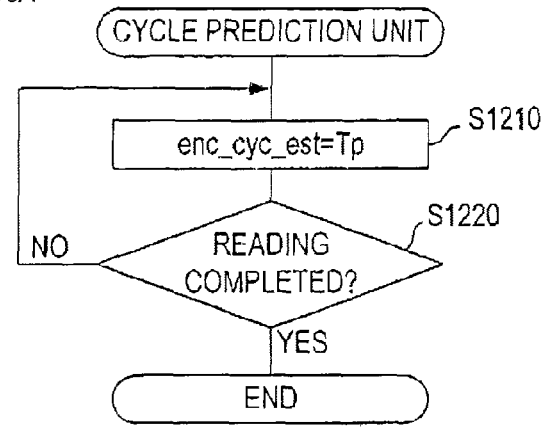
FIG. 16A is a flowchart showing a process in a first embodiment performed by a cycle prediction unit.
Figure 16B:
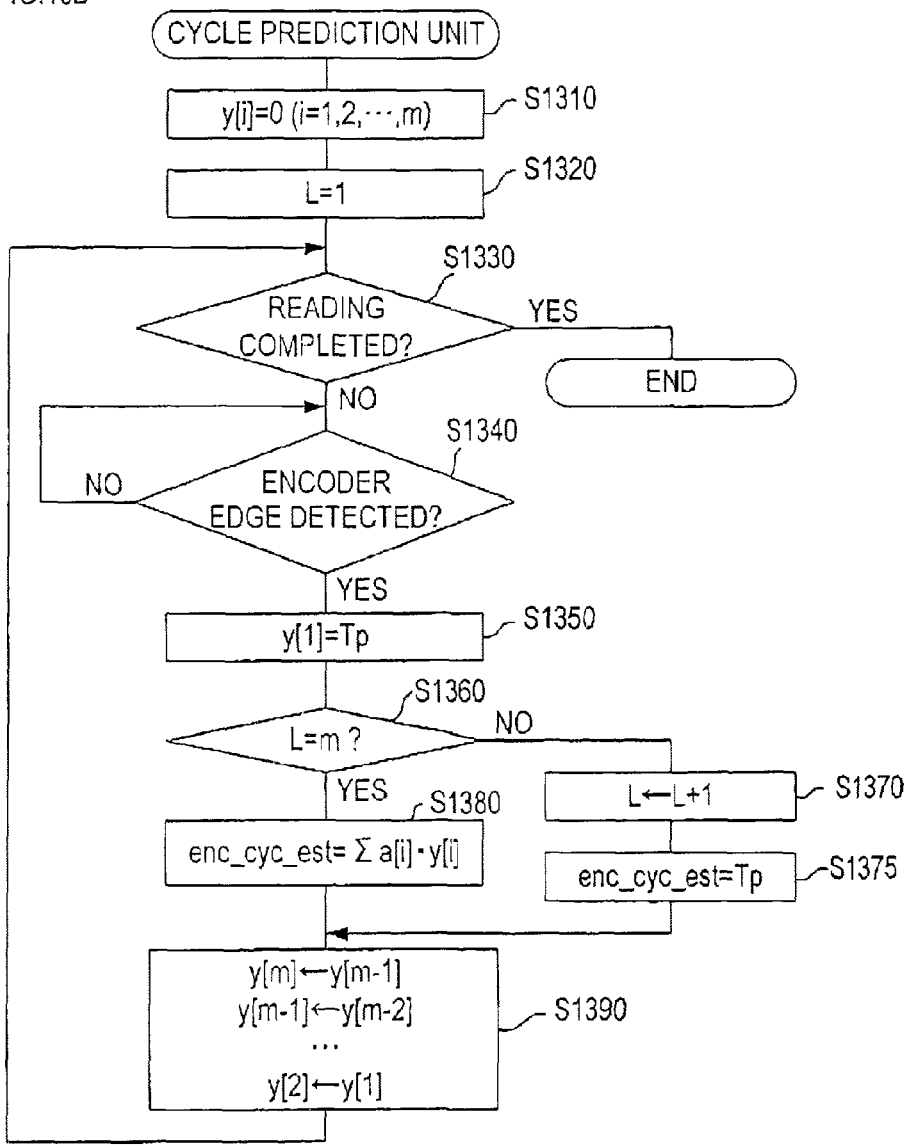
FIG. 16B is a flowchart showing a process in a second embodiment performed by the cycle prediction unit.

A description will now be provided on details of the cycle prediction unit 57 with reference to FIGS. 16A and 16B.

The cycle prediction unit 57 may be configured to perform a process in a first embodiment shown in FIG. 16A or a process in a second embodiment shown in FIG. 16B. Operations in the respective embodiments will be described below using FIG. 16A and FIG. 16B, respectively. Performance of each of the processes shown in FIG. 16A and FIG. 16B is started by the cycle prediction unit 57 when the reading function is activated.

Specifically, when the reading function is activated, the cycle prediction unit 57 in the first embodiment repeatedly performs a processing (S1210) of setting the variable enc_cyc_est to a value Tp inputted from the cycle counter 35 until reading is completed in accordance with the reading completion signal inputted from the image data processing unit 43 (S1220), as shown in FIG. 16A.

The cycle prediction unit 57 calculates an estimated value of a moving distance per unit time of a conveyance target (the CCD line sensor 20 or a reading target) in a case where, after deceleration, stop, rotation in a reverse direction of the motor and an output stop operation of the line start signal are performed in accordance with the req_stop signal, the motor is restarted and is rotated in a forward direction, and an output restart operation of the line start signal is performed. Specifically, the cycle prediction unit 57 outputs an actual measured value Tp, which is measured immediately before the output restart operation is performed, as the estimated value enc_cyc_est of the moving distance per unit time of the conveyance target.

The cycle prediction unit 57 in the second embodiment calculates an estimated value enc_cyc_est in a different manner from the manner in the first embodiment. Specifically, linear prediction of a moving distance per unit time of a conveyance target is performed based on a plurality of values Tp, i.e., values Tp of a number of "m", outputted from the cycle counter 35 by a time when an output restart operation of a line start signal is performed. In this case, a value "m" is a fixed number of 2 or more which may be determined at a designer's discretion.

When the process shown in FIG. 16B is started by the cycle prediction unit 57 in the second embodiment, a variable y[1], y[2], . . . , y[m], is reset to zero (S1310). Then, a variable L is set to "1" (S1320).

Subsequently, it is determined whether or not a reading completion signal has been inputted from the image data processing unit 43 to thereby determine whether or not reading of a reading target (reading of a sheet of document) has been completed (S1330). When it is determined that the reading has been completed (S1330: Yes), the present process is terminated. When it is determined that the reading has not been completed (S1330: No), subsequent processings (S1340 to S1390) are repeatedly performed.

Specifically, the present process waits for an input of an edge detection signal. When an edge detection signal is inputted (S1340: Yes), the variable y[1] is set to a value Tp inputted at the time from the cycle counter 35 (S1350). Then, it is determined whether or not the variable L is equal to the fixed number m (S1360).

When the variable L is not equal to the fixed number m, the variable L is incremented by 1 (S1370), and the variable enc_cyc_est is set to the value Tp (S1375). Subsequently, a processing of updating the variable y[i] to a value y[i−1] is performed with respect to i=2−m, i.e., the variable y[m] is set to a value y[m−1], the variable y[m−1] is set to a value y[m−2], . . . (S1390).

When the variable L is equal to the fixed number m (S1360: Yes), the variable enc_cyc_est is set to a value according to the equation indicated below (S1380). A variable a[i] is a weighting coefficient determined, for example by an experiment, in a design stage.

$$enc\_cyc\_est = a[1] \cdot y[1] + a[2] \cdot y[2] + \ldots + a[m-1] \cdot y[m-1] + a[m] \cdot y[m]$$

After the variable enc_cyc_est is set to a value according to the above equation, the processing of updating the variable y[i] to the value y[i−1] is performed with respect to i=2−m in a same manner as in the case where the variable L is not equal to the fixed number m (S1390).

Subsequent to the processing in S1390, the present process returns to S1330, and the processings from S1350 to S1390 are performed each time an edge detection signal is inputted until the reading is completed.

According to the cycle prediction unit 57 in the second embodiment, as described above, an estimated value enc_cyc_est is calculated by linear prediction of a moving distance per unit time of a conveyance target based on the plurality of values Tp, i.e., values Tp of a number of "m", outputted from the cycle counter 35 by a time when an output restart operation of a line start signal is performed, and the estimated value enc_cyc_est is outputted.

Details of Forced Synchronization Command Generation Unit 59

Figure 17:
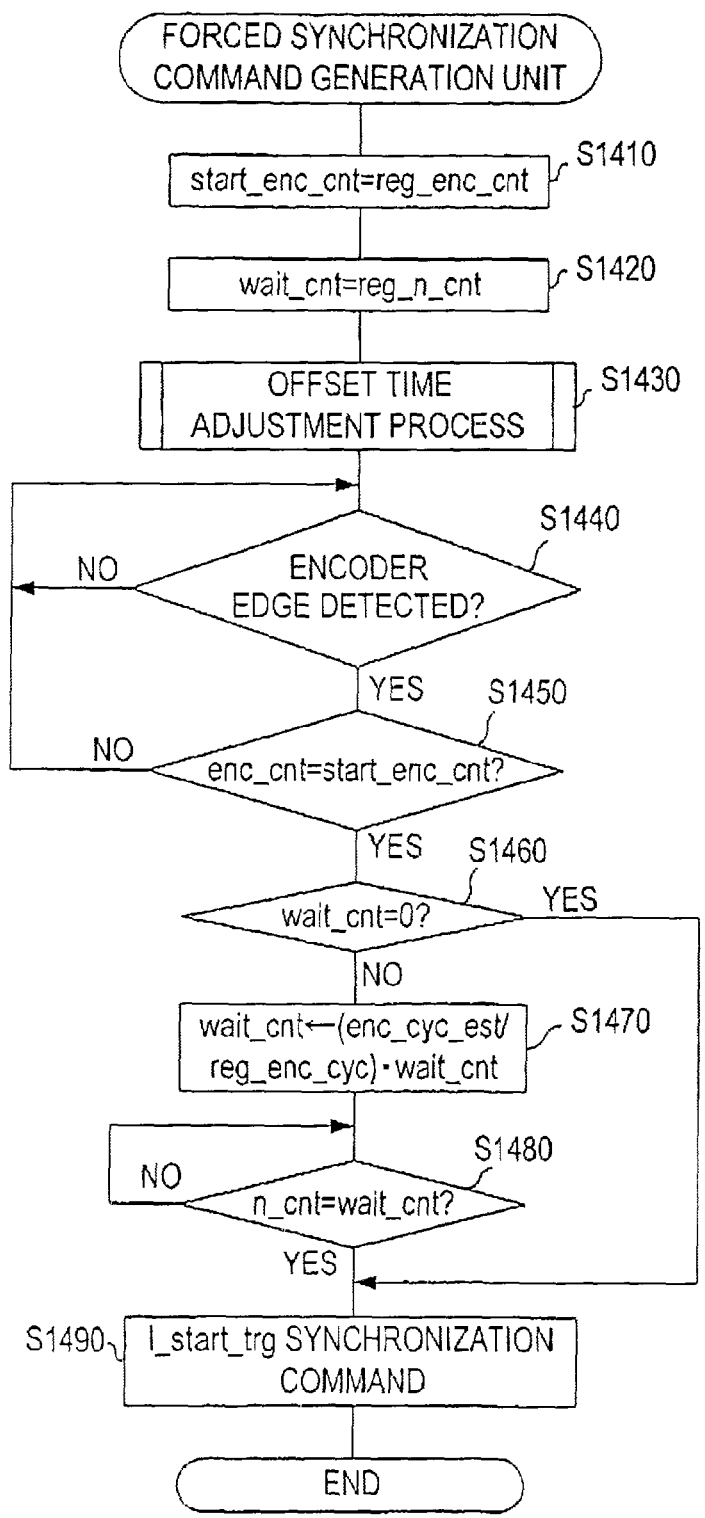
FIG. 17 is a flowchart showing a process performed by a forced synchronization command generation unit.
Figure 19:
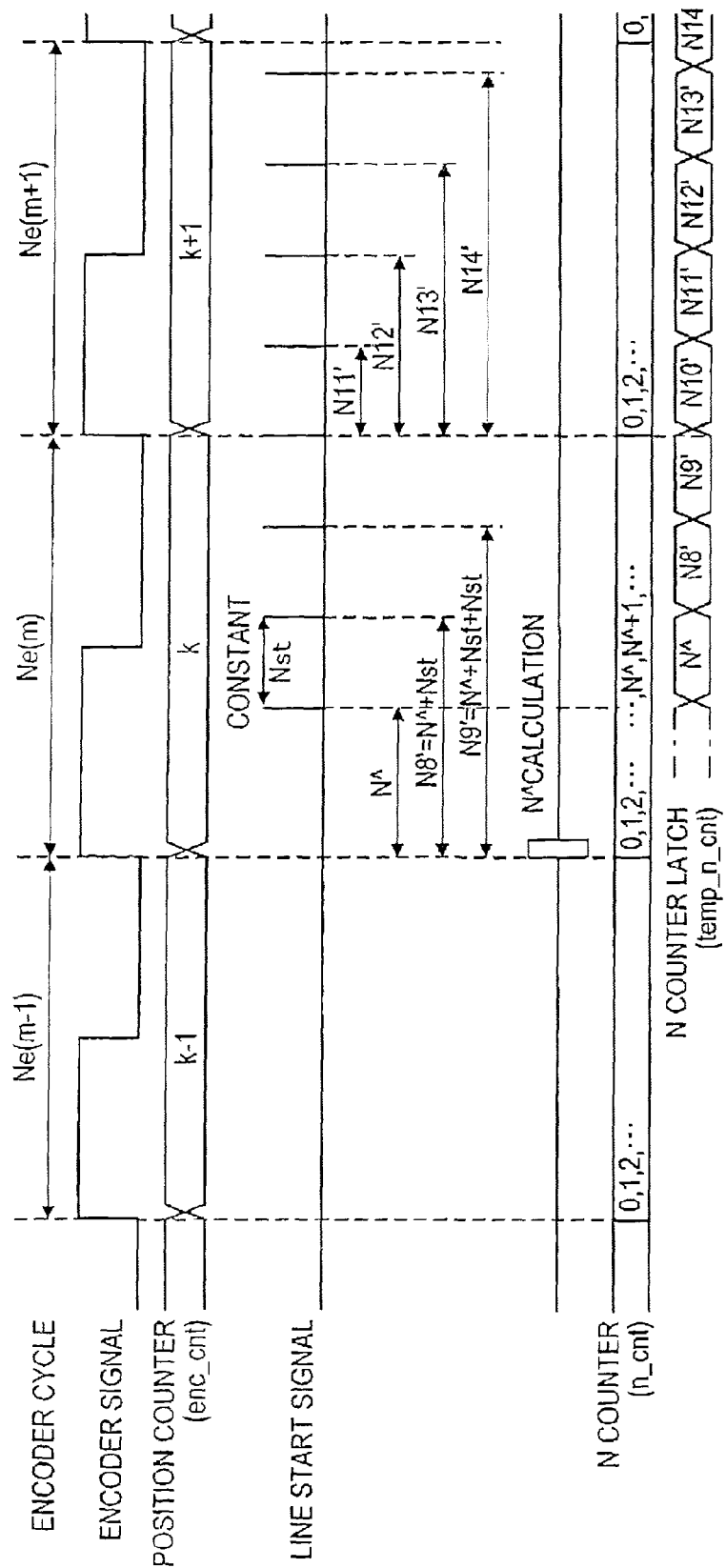
FIG. 19 is a time chart showing an output resumption timing of a line start signal.

A description will now be provided on details of the forced synchronization command generation unit 59 with reference to FIGS. 17 and 19. The forced synchronization command generation unit 59, which is configured for forced synchronization of the line start signal, starts a process shown in FIG. 17 not when the reading function is activated but when a reading restart command is inputted from the CPU 11.

Figure 18:
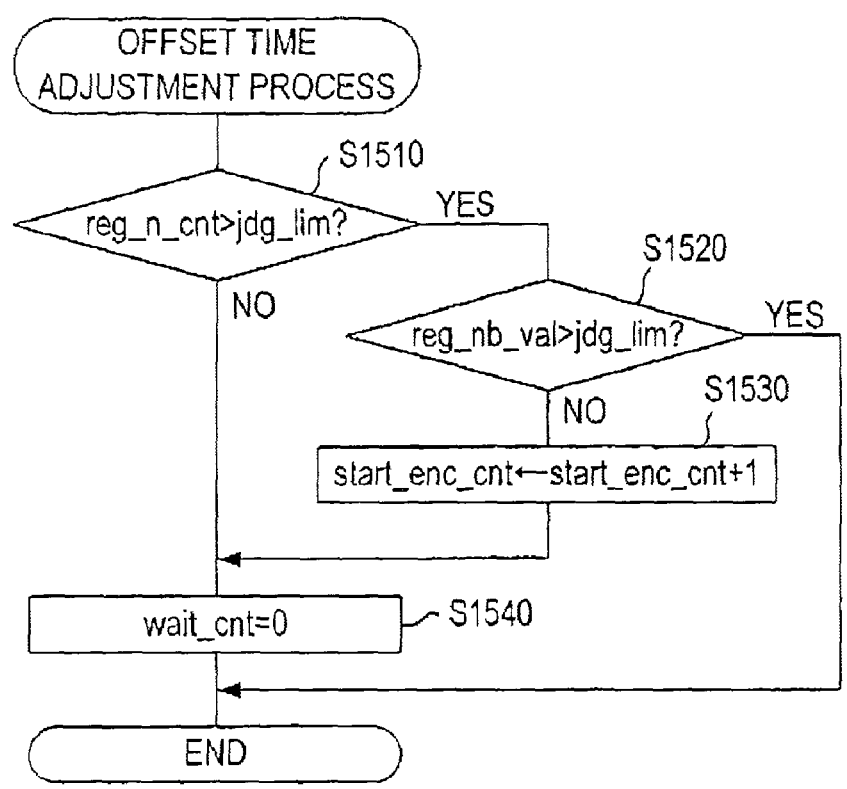
FIG. 18 is a flowchart showing an offset time adjustment process.

When the process shown in FIG. 17 is started by the forced synchronization command generation unit 59, a variable start_enc_cnt is set to a value reg_enc_cnt inputted from the encoder information retention unit 55 (S1410), and a variable wait_cat is set to a value reg_n_cnt inputted from the N counter retention unit 53 (S1420). Then, an offset time adjustment process shown in FIG. 18 is performed (S1430).

When the offset time adjustment process is started, it is determined whether or not the value reg_n_cnt is larger than a threshold value jdm_lim stored in the threshold storage unit 61 (S1510).

When it is determined that reg_n_cnt>jdm_lim (S1510: Yes), it is then determined whether or not a value reg_nb_val is larger than the threshold value jdm_lim (S1520).

When it is determined that reg_n_cnt>jdm_lim and reg_nb_val>jdm_lim (S1520: Yes), no further processing is performed (i.e., no substantial offset time adjustment process is performed) and the present offset time adjustment process is terminated.

When it is determined that reg_n_cnt≦jdm_lim (S1510: No), a wait_cnt is reset to zero (S1540), and the present process is terminated. When it is determined that reg_nb_val≦jdm_lim (1520: No), the variable start_enc_cnt is incremented by "1" (S1530) and the wait_cnt is reset to zero. Then, the present offset time adjustment process is terminated.

When the offset time adjustment process is terminated as above, processings (S1440, S1450) of determining, each time an edge detection signal is inputted, whether or not a value enc_cnt inputted from the position counter 33 at the each time is equal to the value start_enc_cnt are performed until the value enc_cnt becomes equal to the value start_enc_cnt.

When the value enc_cnt becomes equal to the value start_enc_cnt (S1450: Yes), the following processings will be performed in accordance with the value wait_cnt.

Specifically, when the value wait_cut is not zero (S1460: No), a processing of correcting the value wait_cnt to a value obtained by multiplying a current value of wait_cnt by a value obtained by dividing the value enc_cyc_est by the value reg_enc_cyc (S1470). The processing is performed in accordance with the value enc_cyc_est (equal to Ne(m−1) shown in FIG. 19 when the cycle prediction unit 57 performs the process shown in FIG. 16A) inputted from the cycle prediction unit 57 and the value reg_enc_cyc (Ne(n) shown in FIG. 12) inputted from the encoder information retention unit 55.

$$wait\_cnt \leftarrow (enc\_cyc\_est/reg\_enc\_cyc) \cdot wait\_cnt$$

When the processing is completed, the present process waits until a value n_cnt inputted from the N counter unit 51 becomes equal to the corrected value of wait_cnt (S1480).

When the value n_cnt inputted from the N counter unit 51 becomes equal to the corrected value of wait_cnt (S1480: Yes), a synchronization command is inputted to line start trigger signal generation unit 41a (S1490). This causes the line start trigger signal generation unit 41a to periodically generate a line start trigger signal from the time point, to thereby cause the line start signal generation unit 41b to periodically output a line start signal based on the line start trigger signal to the CCD line sensor 20 from the time point.

Thus, in the CCD line sensor 20, a reading operation of the line image (an accumulating operation of the signal electric charge in the light receiving elements) is performed from when the value n_cnt inputted from the N-counter unit 51 becomes equal to the corrected value of wait_cnt (N^ shown in FIG. 19).

FIG. 19 is a time chart showing an output restart timing of a line start signal after the conveyance target is started to move when the value of the restart_sig signal is changed to "1" and thus the reading motor control unit 39 controls the motor.

When the value of wait_cnt is zero (S1460: Yes), the forced synchronization command generation unit 59 immediately inputs a synchronization command to the line start trigger signal generation unit 41a (S1490). This causes the line start trigger signal generation unit 41a to generate a line start trigger signal from a time point when an edge detection signal with the value enc_cnt equal to the value start_enc_cnt is inputted, to thereby cause the line start signal generation unit 41b to periodically output a line start signal based on the line start trigger signal to the CCD line sensor 20 from the time point.

When the above processings are completed, the present process is terminated.

[4] Operation and Advantages

The multifunction apparatus 1 of the present embodiments has been described as above. In the multifunction apparatus 1 of the present embodiments, even when reading of a reading target has not been completed, deceleration and stop operation of the motor is performed and input of the line start signal is stopped to thereby interrupt an operation related to reading as long as the free space of the buffer 45a becomes insufficient.

When conditions to restart are satisfied, control of the movement of the conveyance target through the motor and control of the output of the line start signal are performed to thereby restart reading operation by the CCD line sensor 20.

Before reading is interrupted, an elapsed time from the time of a last input of an edge detection signal from the encoder until the time of an input of a line start signal to the CCD line sensor 20 is constantly measured by the N counter unit 51. Also, a current position of the conveyance target is detected by the position counter 33 based on the edge detection signal outputted from the encoder.

When reading is interrupted, an offset time reg_n_cnt (wait_cnt) is set to a time measured by the N counter unit 51 when the value of the req_stop signal is changed to "1", and a restart reference position reg_enc_cnt (start_enc_cnt) is set to a value enc_cnt (a detected value) outputted from the position counter 33 when the value of the req_stop signal is changed to "1".

There is a possibility that a moving speed of a conveyance target when reading is restarted is not always equal to a moving speed of the conveyance target when reading is interrupted. In view of the possibility, the offset time is corrected, based on a moving time per unit distance reg_enc_cyc when reading is interrupted and an estimated value of a moving time per unit distance enc_cyc_est of the conveyance target in a vicinity of the restart reference position when conveyance of the conveyance target in the image reading direction is restarted, to obtain a corrected offset time.

At this time, the conveyance target is accelerated to a constant speed moving state by a time when the conveyance target reaches the restart reference position reg_enc_cnt. A line start signal is inputted to the CCD line sensor 20 when the corrected offset time has elapsed since a time point when the conveyance target has reached the restart reference position. Thereafter, a line start signal is periodically inputted, and thereby the CCD sensor 20 is caused to perform reading operation from a position where the CCD line sensor 20 is located when the offset time has elapsed. Then, line image data based on a pixel signal outputted from the CCD line sensor 20 is written to the buffer 45a.

That is, in the multifunction apparatus 1 of the present embodiments, an elapsed time from an input time point of an edge detection signal inputted from the encoder is measured to thereby estimate a position of the conveyance target at a reading interruption time point (and thus a reading stop point) based on the input time point of the edge detection signal inputted from the encoder and the elapsed time. When conveyance of the conveyance target in the image reading direction is restarted, an elapsed time from an input time point of an edge detection signal inputted from the encoder is measured, and the reading operation by the CCD line sensor 20 is restarted from the reading stop point.

According to the present embodiments, therefore, even when a resolution performance of an encoder is inferior to a line interval (a distance a conveyance target moves in a cycle of the line start signal during a constant speed driving), it may be possible to restart the reading operation appropriately from the reading stop point, and may be possible to suppress distortion of a read image at a boundary between the reading stop point and the reading restart point.

According to the present embodiments, considering the possibility that a moving speed of a conveyance target in a vicinity of the restart reference position when reading is restarted is not always accurately equal to a moving speed of the conveyance target when reading is interrupted, the offset time is corrected. Accordingly, it may be possible to accurately equalize a moving distance during an elapsed time after passing the restart reference position when reading is interrupted and a moving distance during an elapsed time after passing the restart reference position when reading is restarted. Thus, it may be possible to restart reading operation accurately from the reading stop point, based on the offset time, even when the moving speed when reading is restarted is different from the moving speed when reading is interrupted.

Specifically, in the first embodiment, the process shown in FIG. 16A is performed by the cycle prediction unit 57, and then the process shown in FIG. 17 is performed based on the value enc_cyc_est outputted from the cycle prediction unit 57. By this, an output, that is, a cycle Tp of the cycle counter 35, at a time point of an input of an edge detection signal inputted from the encoder when the conveyance target passes the restart reference position when conveyance of the conveyance target in the image reading direction is restarted, is used as an estimated value T1 of a moving time per unit distance of the conveyance target after the conveyance target passes the restart reference position. Thus, the offset time may be corrected.

In the second embodiment, the process shown in FIG. 16B is performed by the cycle prediction unit 57, and then the process shown in FIG. 17 is performed based on the value enc_cyc_est outputted from the cycle prediction unit 57. By this, a moving time per unit distance of the conveyance target after the conveyance target passes the restart reference position may be estimated based on two or more input cycles Tp of the edge detection signals measured by the cycle counter 35 in a time period before the conveyance target passes the restart reference position when conveyance of the conveyance target in the image reading direction is restarted. Thus, the offset time may be corrected.

According to the method of the second embodiment, the moving time per unit distance of the conveyance target after the conveyance target passes the restart reference position is estimated by means of linear prediction based on two or more input cycles Tp of the edge detection signals measured by the cycle counter 35. Thus, a value closer to an actual value may be obtained as an estimated value, and the reading operation may be restarted more accurately from the reading stop point than in the first embodiment. In contrast, the method of the first embodiment provides an advantage that an estimated value may be obtained more rapidly than the method of the second embodiment.

The present invention should not be limited to the above described embodiments, but may be embodied in various forms. For example, although the value of the variable wait_cnt as the offset time is corrected from the value reg_n_cnt, the forced synchronization command generation unit 59 may be configured so as not to correct the offset time (modified example).

[5] Modified Example

A description of a modified example will now be provided below. A multifunction apparatus 1 of the modified example is different from the above-described embodiment in that the forced synchronization command generation unit 59 performs a process shown in FIG. 20 instead of the process shown in FIG. 17. Therefore, the description will be provided merely on the operation of the forced synchronization command generation unit 59 with reference to a flowchart shown in FIG. 20 and a time chart shown in FIG. 21.

Figure 20:
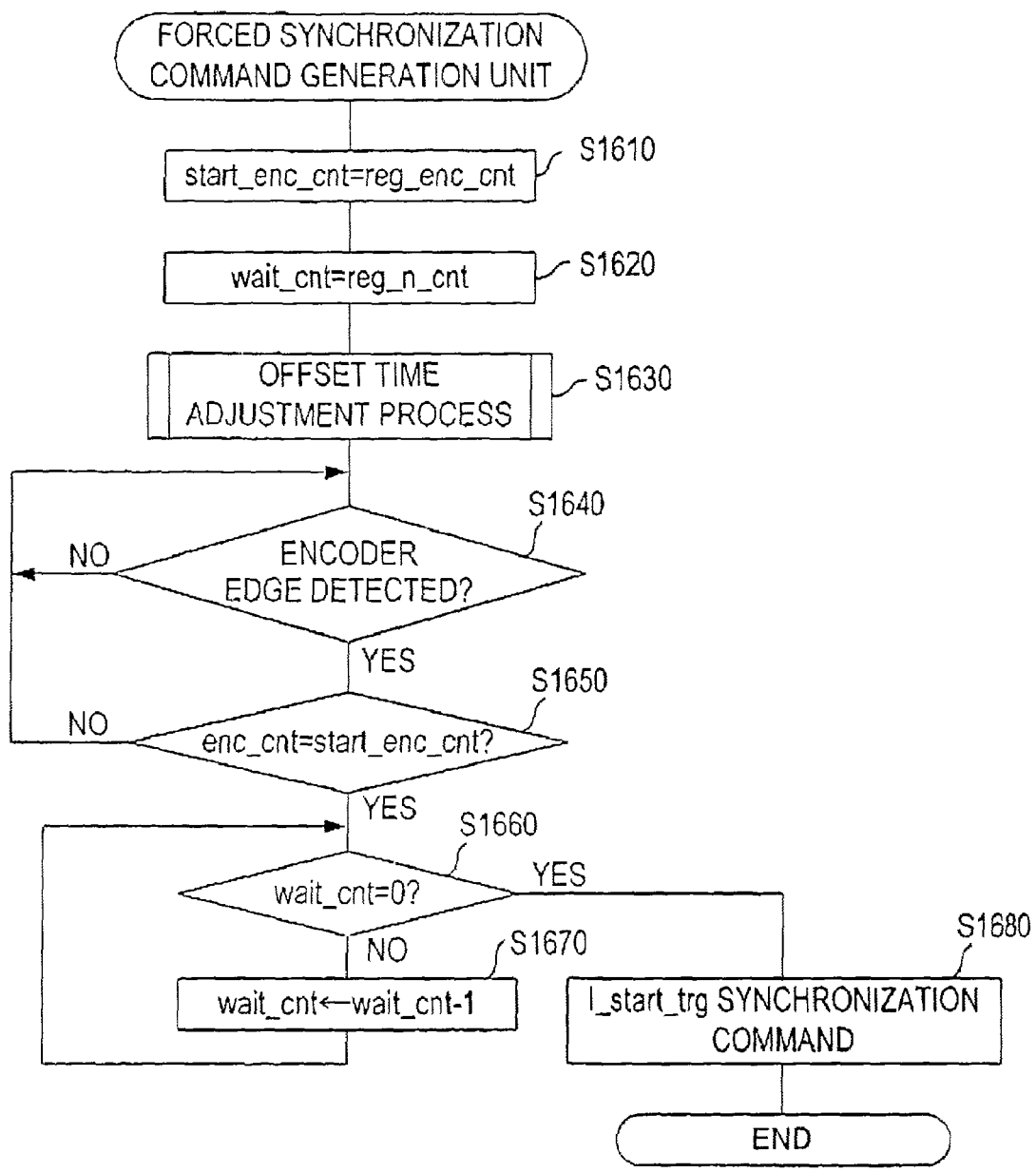
FIG. 20 is a flowchart showing a process performed by a modified example of the forced synchronization command generation unit.
Figure 21:
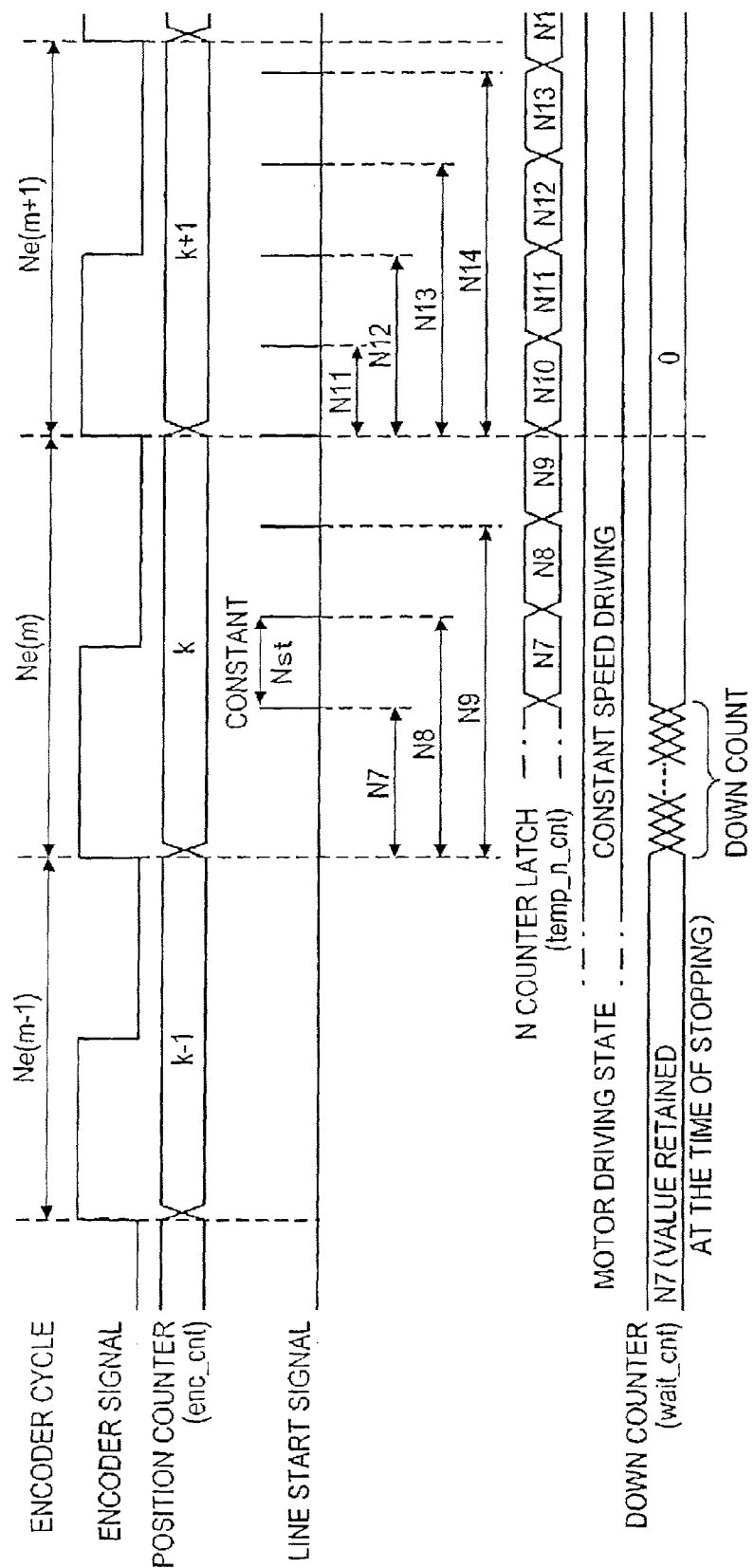
FIG. 21 is a time chart showing an output resumption timing of the modified example of the line start signal.

The flowchart in FIG. 20 shows the process performed by the forced synchronization command generation unit 59 when a reading restart command is inputted from the CPU 11. FIG. 21 is the time chart of the modified example showing an output restart timing of a line start signal after the conveyance target is started to move when the value of the restart_sig signal is changed to "1" and thus the reading motor control unit 39 controls the motor.

When the process shown in FIG. 20 is started by the forced synchronization command generation unit 59, a variable start_enc_cnt is set to a value reg_enc_cnt inputted from the encoder information retention unit 55 at the start of the process (S1610), and a variable wait_cnt is set to a value reg_n_cnt inputted from the N counter retention unit 53 (S1620). Then, an offset time adjustment process shown in FIG. 18 is performed (S1630).

When the offset time adjustment process is terminated, processings (S1640, S1650) of determining, each time an edge detection signal is inputted, whether or not a value enc_cnt inputted from the position counter 33 at the each time is equal to the value start_enc_cnt are performed until the value enc_cnt becomes equal to the value start_enc_cnt.

When the value enc_cnt becomes equal to the value start_enc_cnt, the following processings will be performed in accordance with the value wait_cnt.

Specifically, when the value wait_cnt is not zero (S1660: No), a processing of subtracting "1" from the value wait_cnt is repeatedly performed until the value wait_cnt becomes zero (S1670). The processing of subtracting "1" from the value wait_cnt is performed in synchronization with a clock signal inputted from the clock generation unit 25 in a cycle of the clock signal.

When the value wait_cnt becomes zero (S1660: Yes), a synchronization command is inputted to the line start trigger signal generation unit 41a (S1680). This causes the line start trigger signal generation unit 41a to periodically generate a line start trigger signal from the time point, to thereby cause the line start signal generation unit 41b to periodically output a line start signal based on the line start trigger signal to the COD line sensor 20 from the time point.

Then, in the CCD line sensor 20, a reading operation of the line image (an accumulating operation of the signal electric charge in the light receiving elements) is performed from when the value n_cnt inputted from the N-counter unit 51 becomes equal to the value of wait_cnt (N7 shown in FIG. 21).

When the value of wait_cnt is zero (S1660: Yes), the forced synchronization command generation unit 59 immediately inputs a synchronization command to the line start trigger signal generation unit 41a (S1680). This causes the line start trigger signal generation unit 41a to generate a line start trigger signal from a time point when an edge detection signal with the value enc_cnt equal to the value start_enc_cnt is inputted, to thereby cause the line start signal generation unit 41b to periodically output a line start signal based on the line start trigger signal to the CCD line sensor 20 from the time point.

When the above processings are completed, the present process is terminated.

According to the multifunction apparatus 1 of the modified example configured as above, it may be possible to restart reading operation appropriately from the reading stop point, and may be possible to suppress distortion of a read image at a boundary between the reading stop point and the reading restart point. In this case, however, where the offset time is not corrected, a lower accuracy is achieved compared with the case where the offset time is corrected.

In the above described embodiments and the modified example, the offset time adjustment process is performed so as to facilitate easy control of the output restart of the line start signal in the multifunction apparatus 1. When a edge detection signal is inputted from the encoder within a predetermined time period around the reading interruption time point, the offset time is set to zero so that output of the line start signal is restarted in accordance with the input of the edge detection signal from the encoder.

However, the multifunction apparatus 1 may be configured such that the offset time adjustment process is not performed. Specifically, the forced synchronization command generation unit 59 may be configured not to perform the processings in S1430 or S1630.

Although the CCD line sensor 20 is employed as the reading unit in the above embodiments, the reading unit may be a contact image sensor (CIS). Although a rotary encoder is employed as the encoder EN2 in the above embodiments, the encoder EN2 may be a linear encoder.

Although a DC motor is employed as the reading motor MT2 in the above embodiments, the reading motor MT2 may be a motor of another type, such as a pulse motor.

In the above embodiments, the stop_sig signal for temporarily stopping transfer of line image data from the reading front end 41 and the restart_sig signal for restarting transfer of line image data are outputted based on the amount of free space of the buffer 45*a*. However, these signals may be, for example, outputted in accordance with a command externally inputted through the operation panel 23, or outputted depending on a conveyance state or a reading state of a document.

Also, the conveyance target may be moved at a constant speed from when the conveyance target passes the restart reference position until when a next edge detection signal (an event occurrence signal) is inputted, each of when the reading is interrupted and when conveyance of the conveyance target is restarted.

In the above embodiments, the cycle prediction unit 57 starts operation when the reading function is activated and constantly calculates the estimated value. However, the cycle prediction unit 57 may be configured to start operation at a predetermined timing or to operate for a predetermined time period to calculate the estimated value.

What is claimed is:

1. An image reading apparatus comprising:
   a reading unit that reads image information of a reading target;
   a conveyance mechanism that conveys one of the reading unit and the reading target as a conveyance target;
   a reading control device that controls a moving speed of the conveyance target through the conveyance mechanism to thereby move the conveyance target at a constant speed in an image reading direction and periodically inputs a line start signal to the reading unit to thereby specify a reading start timing of a line image on the reading target so that the reading unit is caused to perform a reading operation of each line;
   a stop control device that stops a process by the reading control device under a predetermined condition;
   an encoder that outputs an event occurrence signal each time the conveyance target is moved by a predetermined distance, wherein a plurality of the line start signals are inputted to the reading unit within an output interval of the event occurrence signal in a case where the conveyance target moves at the constant speed;
   a position detection device that detects a current position of the conveyance target based on an event occurrence signal inputted from the encoder;
   an elapsed time measuring device that measures, with respect to each of the plurality of the line start signals, an elapsed time from a time point when a last event occurrence signal is inputted from the encoder until a time point when a line start signal is inputted to the reading unit;
   a time setting unit that sets an offset time based on the elapsed time measured by the elapsed time measuring device, the elapsed time being an elapsed time until a reading interruption time point when a last line start signal is inputted to the reading unit at or before a time point when a stop operation on the reading control device is performed by the stop control device;
   a position setting unit that sets, as a restart reference position, a position of the conveyance target detected by the position detection device correspondingly to an input of a last event occurrence signal inputted at or before the reading interruption time point; and
   a retreat control device that moves the conveyance target through the conveyance mechanism, when a stop operation is performed by the stop control device, in an opposite direction to the image reading direction to a position forward from the restart reference position set by the position setting unit,
   wherein the reading control device again moves the conveyance target, which has been moved by the retreat control device, at a constant speed in the image reading direction under a predetermined condition, inputs a line start signal to the reading unit when an offset time set by the time setting unit has elapsed from a time point when the conveyance target reaches the restart reference position set by the position setting unit, and subsequently periodically inputs a line start signal to thereby cause the reading unit to perform a reading operation from a point where the reading unit is located when the offset time has elapsed.

2. The image reading apparatus as set forth in claim 1, wherein the reading control device performs a process of generating read image data of each line based on image information read by the reading unit and writing the generated read image data to a buffer.

3. The image reading apparatus as set forth in claim 2, further comprising:
   an interruption determination device that determines whether or not interruption of the process by the reading control device is necessary based on a predetermined condition,
   wherein the stop control device stops the process by the reading control device when it is determined by the interruption determination device that interruption of the process by the reading control device is necessary.

4. The image reading apparatus as set forth in claim 3, wherein the interruption determination device is adapted to determine whether or not interruption of the process by the reading control device is necessary based on an amount of free space of the buffer.

5. The image reading apparatus as set forth in claim 1, wherein the time setting unit sets the offset time to an elapsed time, measured by the elapsed time measuring device, from a time point when the last event occurrence signal is inputted at or before the reading interruption time point until the reading interruption time point.

6. The image reading apparatus as set forth in claim 1, further comprising:
a restart determination device that determines whether or not restart of the process by the reading control device is necessary based on a predetermined condition while the process by the reading control device is interrupted,
wherein, when it is determined by the restart determination device that restart of the process by the reading control device is necessary, the reading control device again moves the conveyance target, which has been moved by the retreat control device, at a constant speed in the image reading direction, inputs a line start signal to the reading unit when an offset time set by the time setting unit has elapsed from a time point when the conveyance target reaches the restart reference position set by the position setting unit, and subsequently periodically inputs a line start signal so that the reading unit is caused to perform a reading operation from a point where the reading unit is located when the offset time has elapsed.

7. The image reading apparatus as set forth in claim 6, wherein the restart determination device is adapted to determine whether or not restart of the process by the reading control device is necessary based on an amount of free space of the buffer.

8. The image reading apparatus as set forth in claim 1, further comprising:
a correction unit that corrects, when the process by the reading control device is restarted, an offset time set by the time setting unit in accordance with a moving time per unit distance required for a movement of the conveyance target by a unit distance,
wherein the reading control device inputs a line start signal to the reading unit when a corrected offset time corrected by the correction unit has elapsed from a time point when the conveyance target reaches the restart reference position set by the position setting unit so that the reading unit is caused to perform a reading operation from a point where the reading unit is located when the corrected offset time has elapsed.

9. The image reading apparatus as set forth in claim 8, further comprising:
a moving time measuring device that measures the moving time per unit distance while the conveyance target is moved by an operation of the reading control device,
wherein the encoder outputs an event occurrence signal each time the conveyance target is moved by a predetermined fixed distance.

10. The image reading apparatus as set forth in claim 9, wherein the correction unit includes an estimation device that estimates, under a predetermined condition, an estimated value T1 which is a moving time per unit distance after the conveyance target passes the restart reference position when the process by the reading control device is restarted, based on the moving time per unit distance measured by the moving time measuring device, and corrects the offset time set by the time setting unit based on the estimated value T1 estimated by the estimation device and a moving time per unit distance T2 after the conveyance target passes the restart reference position, measured by the moving time measuring device when the process by the reading control device is interrupted.

11. The image reading apparatus as set forth in claim 10, wherein the correction unit is adapted to correct an offset time Toff set by the time setting unit to an offset time Toff'=T1/T2·Toff.

12. The image reading apparatus as set forth in claim 9, wherein the moving time measuring device is adapted to measure an input cycle of the event occurrence signal inputted from the encoder as the moving time per unit distance.

13. The image reading apparatus as set forth in claim 12, wherein the correction unit uses, as the moving time per unit distance T2, a time from an input time point of the event occurrence signal inputted when the conveyance target passes the restart reference position to an input time point of the next event occurrence signal when the process by the reading control device is interrupted, the time being a cycle measured by the moving time measuring device when the next event occurrence signal is inputted from the encoder after the conveyance target passes the restart reference position when the process by the reading control device is interrupted.

14. The image reading apparatus as set forth in claim 12, wherein the estimation device determines, as the estimated value T1, a cycle measured by the moving time measuring device due to an input of the event occurrence signal from the encoder when the conveyance target passes the restart reference position when the process by the reading control device is restarted, the cycle being a time from an input time point of the event occurrence signal to an input time point of an immediately previous event occurrence signal.

15. The image reading apparatus as set forth in claim 12, wherein the estimation device determines the estimated value T1, based on at least two cycles measured by the moving time measuring device in a time period at or before a time point when the conveyance target passes the restart reference position when the process by the reading control device is restarted.

16. The image reading apparatus as set forth in claim 1, wherein the time setting unit is adapted to set the offset time to zero when an elapsed time until the reading interruption time point measured by the elapsed time measuring device is shorter than a predetermined time.

17. The image reading apparatus as set forth in claim 1, further comprising:
an input determination device that determines whether or not an event occurrence signal has been inputted from the encoder within a predetermined time period in the future direction from the reading interruption time point,
wherein the time setting unit is adapted to set the offset time to zero regardless of the elapsed time until the reading interruption time point measured by the elapsed time measuring device, when it is determined by the input determination device that an event occurrence signal has been inputted from the encoder within the predetermined time period in the future direction from the reading interruption time point,
wherein the position setting device is adapted to set, as the restart reference position, a position of the conveyance target detected by the position detection device correspondingly to an input of a first event occurrence signal in the future from the reading interruption time point, when it is determined by the input determination device that an event occurrence signal has been inputted from the encoder within the predetermined time period in the future direction from the reading interruption time point.

18. The image reading apparatus as set forth in claim 1, wherein the conveyance mechanism includes a DC motor and conveys the conveyance target by a driving force of the DC motor.

* * * * *